United States Patent
Hewitt

(10) Patent No.: US 10,699,080 B2
(45) Date of Patent: *Jun. 30, 2020

(54) CAPTURING RICH RESPONSE RELATIONSHIPS WITH SMALL-DATA NEURAL NETWORKS

(71) Applicant: QUALTRICS, LLC, Provo, UT (US)

(72) Inventor: John Hewitt, Philadelphia, PA (US)

(73) Assignee: QUALTRICS, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,209

(22) Filed: Jul. 24, 2019

(65) Prior Publication Data

US 2019/0347329 A1 Nov. 14, 2019

Related U.S. Application Data

(63) Continuation of application No. 15/841,963, filed on Dec. 14, 2017, now Pat. No. 10,380,260.

(51) Int. Cl.
*G06F 40/30* (2020.01)
*G06N 3/08* (2006.01)
(Continued)

(52) U.S. Cl.
CPC ............ *G06F 40/30* (2020.01); *G06F 40/205* (2020.01); *G06F 40/216* (2020.01); *G06F 40/253* (2020.01); *G06F 40/268* (2020.01); *G06F 40/284* (2020.01); *G06N 3/0445* (2013.01); *G06N 3/08* (2013.01)

(58) Field of Classification Search
CPC ............. G06F 17/2785; G06F 17/2755; G06F 17/277; G06F 17/2715; G06F 17/274; G06F 17/2705; G06N 3/0445; G06N 3/08
See application file for complete search history.

(56) References Cited

U.S. PATENT DOCUMENTS 7,996,440 B2   8/2011  Probst et al.
8,799,773 B2 *  8/2014  Reis ...................... G06F 16/345
                                                                    715/254

(Continued)

OTHER PUBLICATIONS

U.S. Appl. No. 15/841,963, filed Nov. 26, 2018, Office Action.
U.S. Appl. No. 15/841,963, filed Apr. 8, 2019, Notice of Allowance.

*Primary Examiner* — Stella L. Woo
(74) *Attorney, Agent, or Firm* — Keller Jolley Preece

(57) ABSTRACT

The present disclosure relates to a response analysis system that employs a small-data training dataset to train a neural network that accurately performs domain-agnostic opinion mining. For example, in one or more embodiments, the response analysis system trains a response classification neural network using part of speech information (e.g., syntactic information) to learn and apply response classification labels for opinion text responses. In particular, the response analysis system employs part of speech information patterns without regard to word patterns to determine whether words in a text response correspond to an opinion, the target of the opinion, or neither. In addition, the trained response classification neural network has a significantly reduced learned parameter space, which decreases processing, memory requirements, and overall complexity.

20 Claims, 13 Drawing Sheets

410─

| Response 412 | Acme | had | really | good | services |
|---|---|---|---|---|---|
| Parts Of Speech Label 414 | Proper Noun | Verb | Adverb | Adjective | Noun |
| Response Classification Label 416 | Neither | Neither | Opinion | Opinion | Target |

(51) Int. Cl.
*G06N 3/04* (2006.01)
*G06F 40/205* (2020.01)
*G06F 40/216* (2020.01)
*G06F 40/253* (2020.01)
*G06F 40/268* (2020.01)
*G06F 40/284* (2020.01)

(56) References Cited

U.S. PATENT DOCUMENTS

| | | |
|---|---|---|
| 10,380,260 B2 * | 8/2019 | Hewitt ............... G06F 17/2755 |
| 2005/0125216 A1 * | 6/2005 | Chitrapura .......... G06F 17/2785 |
| | | 704/1 |
| 2008/0154883 A1 * | 6/2008 | Chowdhury .......... G06F 3/0482 |
| 2008/0215571 A1 * | 9/2008 | Huang ................. G06F 16/345 |
| 2014/0067370 A1 * | 3/2014 | Brun ..................... G06F 17/271 |
| | | 704/9 |
| 2017/0004184 A1 | 1/2017 | Jain et al. |
| 2017/0091816 A1 | 3/2017 | Moreau et al. |
| 2017/0124575 A1 | 5/2017 | Clark et al. |
| 2018/0173698 A1 | 6/2018 | Dubey et al. |
| 2018/0196881 A1 | 7/2018 | Lundin et al. |
| 2018/0300608 A1 | 10/2018 | Sevrens et al. |

* cited by examiner

| Response 412 | Acme | had | really | good | services |
|---|---|---|---|---|---|
| Parts Of Speech Label 414 | Proper Noun | Verb | Adverb | Adjective | Noun |
| Response Classification Label 416 | Neither | Neither | Opinion | Opinion | Target |

*Fig. 4A*

| Response 422 | Acme | had | really | good | services |
|---|---|---|---|---|---|
| Most Attended Word 424 | had | Acme | services | services | good |

*Fig. 4B*

CAPTURING RICH RESPONSE RELATIONSHIPS WITH SMALL-DATA NEURAL NETWORKS

CROSS-REFERENCE TO RELATED APPLICATIONS

The present application is a continuation of U.S. application Ser. No. 15/841,963, filed on Dec. 14, 2017. The aforementioned application is hereby incorporated by reference in its entirety.

BACKGROUND

Recent years have seen a significant increase in the use of computing devices in creating, performing, and analyzing free-form opinion text responses (e.g., survey responses, user feedback, and online reviews). Indeed, it is common for an individual to fill out a survey response using a computing device for a product or service offered by a business, person, school, or other entity. In many cases, a respondent provides a text response when expressing their opinion. For example, a respondent uses a mobile device to write a few sentences as part of a survey, social media post, or electronic message.

While conventional text analysis systems have attempted to extract feedback information from text responses, the conventional systems struggle to accurately extract opinions from text responses. Indeed, conventional systems have employed the same feedback extraction techniques and methods for over a decade. For example, most conventional systems employ application-level natural language processing to extract opinions from text responses. In particular, many conventional systems employ machine-learning algorithms in connection with natural language processing for opinion mining. However, these conventional methods present several disadvantages, such as missing rich opinion insights that may be valuable to businesses, entities, and other entities.

One disadvantage, for instance, is that conventional systems require large datasets to sufficiently train a machine-learning algorithm. For example, with English text responses, conventional systems need to learn proper context and meaning for about 200,000 unique words. To achieve this learning, a conventional system needs to learn tens of thousands of sentences. Also, if the training dataset is not adequately large, the machine-learning algorithm will produce poor and inaccurate results.

As the size of a training dataset increases, additional problems arise. For example, a larger training dataset requires additional processing resources to obtain a learned parameter space as well as additional memory and storage to store the training dataset and the learned space. Indeed, the learned space is often too large to store on many client devices. Moreover, a larger training dataset requires additional rules to learn, which in turn, increases the complexity and processing time of executing the machine-learning algorithm in the future. Further, because conventional systems commonly learn using supervised training data, a human must manually tag, label, and/or annotate each sentence in the training dataset. The cost of labeling potentially hundreds of thousands of items in large training dataset can be exorbitant and prohibitive.

As another problem, training datasets used by conventional systems are often domain-specific. For instance, a conventional system attempting to analyze text responses with respect to customer service must employ a training dataset that includes words, terms, and phrases related to customer service. If the conventional system is mining opinions from specific or uncommon domains, a sufficiently large training dataset may not exist or be available, which prevents the conventional system from accurately training a machine-learning algorithm.

In addition, conventional opinion mining systems often experience out-of-vocabulary issues where the trained machine-learning algorithm encounters data not included in the training dataset. Thus, despite the large training dataset, the increased processing resources, and the additional memory, conventional systems still produce inaccurate results. Accordingly, these and other problems exist with regard to conventional systems and methods for opinion mining from free-form text responses.

SUMMARY

Embodiments of the present disclosure provide benefits and/or solve one or more of the foregoing or other problems in the art with systems, computer media, and methods for opinion mining from free-form opinion text responses. For example, the disclosed systems employ uniquely efficient small-data training datasets to accurately train a neural network to analyze, extract, classify, and provide filtered opinions to users. In particular, the disclosed systems employ parts of speech (e.g., part of speech or syntactic information) and learned text response patterns to determine whether words and terms in a text response correspond to an opinion, the target of the opinion, or are irrelevant to the opinion (e.g., neither the opinion or target of the opinion).

For example, the disclosed systems can obtain a small-data training dataset that includes tagged sentences from text responses. For each of the sentences in the training dataset, the disclosed systems can generate one or more word-agnostic vectors based on a part of speech label and a response classification assigned to each word. In particular, the disclosed systems generate word-agnostic vectors that do not include word-semantic information, but rather other linguistic and syntactical information corresponding to each word. Based on the word-agnostic vectors for each word in each sentence of the training dataset, the disclosed systems train a response classification neural network.

Moreover, the disclosed systems receive an input sentence of a text response that corresponds to an expressed opinion. In response, the disclosed systems can determine a part of speech for each word in the input sentence. Based on the parts of speech of the words, the disclosed systems can employ the trained response classification neural network mentioned above to determine a response classification label for each word from the input sentence. Accordingly, the disclosed systems can present a target portion (e.g., words labeled as a target) and an opinion portion (e.g., words labeled as an opinion) of the input sentence to a user.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description describes one or more embodiments with additional specificity and detail through the use of the accompanying drawings, as briefly described below.

FIGS. 4A and 4B illustrate example characteristic tables for a text response in accordance with one or more embodiments.

DETAILED DESCRIPTION

Figure 1:
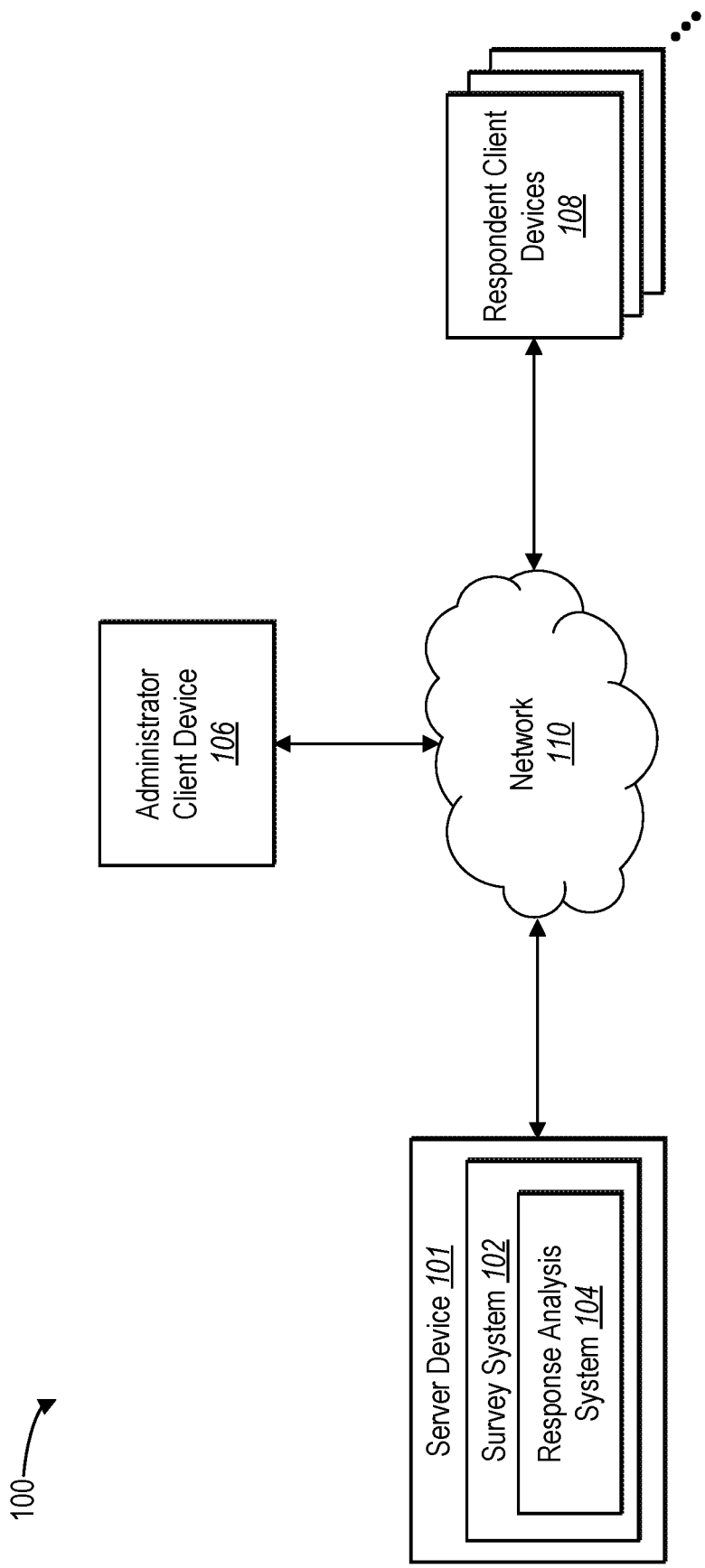
FIG. 1 illustrates a schematic diagram of an exemplary environment in which a response analysis system may be implemented in accordance with one or more embodiments.

This disclosure describes one or more embodiments of a response analysis system that employs a small-data training dataset to train a neural network that accurately performs domain-agnostic opinion mining. For example, in one or more embodiments, the response analysis system trains a response classification neural network using parts of speech (e.g., part of speech or syntactic information) to learn and apply response classification labels for text responses that include an opinion of a respondent. As further described below, the response analysis system trains and employs a response classification neural network that has a significantly reduced learned parameter space, which decreases processing requirements, memory resources, and overall complexity of the response analysis system.

To illustrate, the response analysis system, in various embodiments, obtains a training dataset that includes words and sentences. In one or more embodiments, the training dataset can be a small-data training dataset that includes a few thousand sentences (e.g., fewer than 2,500 sentences). Notwithstanding the small-data training set, the response analysis system can use the principles described herein to train a neural network that results in a domain-agnostic neural network. Indeed, the domain of the small-data training set can correspond to any domain (e.g., topics such as sports, politics, engineering) and the resulting trained response classification neural network is domain-agnostic (e.g., can accurately and effectively processes text regardless of the domain).

As part of obtaining a small-data training dataset (or simply "training dataset"), the disclosed systems can generate word-agnostic vectors based on a part of speech label (e.g., a word's syntactic role in a sentence) and a response classification assigned (e.g., manually-labeled or recursively generated) to each word of sentences within a training dataset. In general, a word-agnostic vector does not include semantic information of the word itself. Rather, the word-agnostic vector contains information corresponding to the word's part of speech as used in a training or input sentence. In some embodiments, as part of obtaining the small-data training dataset, the response analysis system can automatically determine and assign parts of speech to each of the words in the training dataset of sentences to generates word-agnostic vectors based on identified parts of speech and response classification labels for each word in a sentence.

In some embodiments, a word-agnostic vector can contain other linguistic and syntactic information as well as information corresponding to surrounding words in a sentence. In other words, the response analysis system also can generate word-agnostic vectors based on additional vector information. For example, the response analysis system can use dependency labels, attention mechanism information, and/or transfer information to generate word-agnostic vectors.

Based on the word-agnostic vectors for words in each of the sentences from the training dataset, in one or more embodiments, the response analysis system trains a response classification neural network. For instance, a trained response classification neural network indicates distances between parts of speech associated with word-agnostic vectors within the learned parameter space. Indeed, the response analysis system uses the word-agnostic vectors corresponding to words in the training dataset to train the response classification neural network. In some embodiments, the response classification neural network is a bi-directional long short-term memory (LSTM) recurrent neural network (RNN). Additionally, or alternatively, the response analysis system trains and employs additional neural networks. For example, the response analysis system can employ a second recurrent neural network to provide outputted response classification labels back to the response classification neural network, as further described below.

Once the response analysis system trains a neural network with the training dataset, the response analysis system can employ the trained neural network to determine response classification labels for input text that include opinions. For example, given an input sentence that includes input word(s), a trained response classification neural network outputs a response classification label for an input word within the input sentence. Examples of response classification labels include an opinion classification label, a target classification label of the opinion (e.g., a subject of the opinion such as a person or product), or a label that indicates a word is neither a target or an opinion (e.g., a neither classification label).

To illustrate, in one or more embodiments, the response analysis system receives an input sentence that includes multiple words. Next, the response analysis system can determine parts of speech for each word in the input sentence. Based on the parts of speech of the words, the response analysis system can employ the trained response classification neural network to determine a response classification label for each word from the input sentence (e.g., opinion, target, or neither). By determining the response classification label for each word, the response analysis system can present a filtered version of the input sentence to a user. For a given input sentence, the response analysis system provides a target portion (e.g., words labeled as a target) and an opinion portion (e.g., words labeled as an opinion). In addition, the response analysis system can further analyze, classify, organize, and/or process filtered input sentences based on the classification labels corresponding to words within the input sentence.

Although the response analysis system can analyze text from a variety of sources, in one or more embodiments, the response analysis system operates in connection with a digital survey system. For instance, the response analysis system is part of, or communicates with, a digital survey system that creates, administers, and collects survey responses from electronic surveys (e.g., opinion text responses). For example, the response analysis system communicates with an administrator device (i.e., client devices) that enables an administrator to manage an electronic survey. In addition, the response analysis system can communicate with respondent devices (i.e., client devices) whereby respondents provide opinion text responses in reply to electronic survey questions within the electronic survey.

Based on received opinion text responses, the response analysis system can determine response classification labels for each opinion text response using a trained response classification neural network. For example, using a trained response classification neural network, the response analysis system can provide an opinion text response as an input to the classification neural network to determine a response classification label for each word in the opinion text response. For instance, the response analysis system receives an opinion text response, automatically identifies parts of speech—or word-agnostic vector information—for each word in the opinion text response. The response analysis system can then employ the response classification neural network to determine response classification labels for each word in the opinion text response (e.g., a target, opinion, or neither).

Additionally, the response analysis system can filter opinion text responses based on the response classification labels associated with each word. For example, the response analysis system filters and presents a target portion and an opinion portion to an administrator via an administrator device. In this manner, the administrator can quickly and accurately process filtered opinion text responses. In addition, the response analysis system can use the response classification labels to further organize, classify, and analyze opinion text responses.

The response analysis system provides many advantages and benefits over conventional systems and methods. For example, the response analysis system overcomes the need for obtaining and employing large training datasets along with their numerous accompanying issues. In particular, the response analysis system trains and operates a response classification neural network using word-agnostic vectors (e.g., indicating parts of speech or syntactic information) rather than using semantic-specific word vectors (e.g., indicating semantic information of unique words).

As mentioned above, and based on the word-agnostic vectors, the response analysis system can train a response classification neural network using a small-data training dataset. For example, the response analysis system can accurately train the response classification neural network using 1,000-2,500 sentences. In contrast, conventional systems require tens of thousands or hundreds of thousands of sentences that are often domain specific to particular subject matter. Accordingly, the cost and time of preparing and training a neural network with the small-data training dataset is trivial compared conventional systems.

In particular, the response analysis system learns recognized language patterns in connection with opinion text responses, as opposed to conventional system that learn based on semantic meanings for as many possible words that could occur in an opinion text response. Accordingly, the response analysis system can employ a significantly smaller training dataset using parts of speech (e.g., part of speech information) and achieve the same or more accurate results than conventional systems.

To further illustrate, parts of speech are treated similarly across all sentences in a training dataset of opinion text responses and even in non-opinion training datasets. Indeed, the vast majority of sentences within opinion text responses include a subject and a verb. Similarly, many opinion text responses include adverbs, adjectives, articles, objects, etc. Thus, because parts of speech are used in virtually every opinion text response, significantly less data is needed to accurately train the response classification neural network that is efficient, stable, and accurate. In contrast, conventional systems that train using the semantic meaning of words require a massive training dataset (e.g., tens of thousands of sentences or more) to get an adequate sample size for each unique learned word, which further results in complex rules, system instability, and inaccurate results.

As another advantage, employing parts of speech as part of a training dataset enables the response analysis system to be domain-agnostic. For example, the response analysis system can train a neural network using any type of opinion training dataset that has targets and opinions labeled. For instance, using a training dataset related to Product X, the response analysis system can determine response classification labels for another product or service, as both the response for Product X and the responses for another product or service include the same language patterns with respect to parts of speech respect. In some embodiments, the response analysis system can train using a training dataset having non-opinion text responses that include objects (i.e., targets) and language describing the objects (i.e., opinions).

Additionally, because employing parts of speech information enables the response analysis system to be domain-agnostic, the response analysis system can identify response classification labels for responses for which no training dataset exists. Further, the response analysis system can use the same trained response classification neural network to determine response classification labels for diverse subject areas (i.e., domains) with respect to opinion mining. Similarly, by employing parts of speech information to train and apply the response classification neural network, the response analysis system overcomes the out-of-vocabulary issue. As mentioned above, a conventional system may encounter a word or phrase not found in the training dataset. However, since the response classification neural network is word-agnostic and the maximum number of possible parts of speech is small (e.g., about 50), the out-of-vocabulary issue is minimized, if not altogether eliminated.

The response analysis system also provides numerous computer processing and storage advantages. For example, because the number of possible parts of speech is small and there are fewer rules to learn, the resulting learned parameter space of the response classification neural network is likewise small. Along with significantly reducing the storage space needed to maintain the response classification neural network over conventional systems, the amount of computational processing resources and time to train and execute the response classification neural network is also significantly reduced. Accordingly, most modern computing devices can train, maintain, store, and employ the disclosed response classification neural network, as opposed to conventional system that often require specialized server systems to host large and complex neural networks.

Referring now to the figures, FIG. 1 illustrates a schematic diagram of an environment 100 in which a response analysis system 104 may be implemented in accordance with one or more embodiments. As illustrated, the environment 100 includes various computing devices including a server device 101 that hosts an electronic survey system 102 (or simply "survey system"), a response analysis system 104, an administrator client device 106 (associated with an administrator), and respondent client devices 108 (associated with corresponding respondents). As shown in FIG. 1, each device is connected via a network 110. Additional details regarding the various computing devices (e.g., the server device 101, the administrator client device 106, and respondent client devices 108) and networks (e.g., network 110) are explained below with respect to FIGS. 9 and 10.

As illustrated in FIG. 1, the environment 100 includes the server device 101 that hosts the survey system 102 and the response analysis system 104. In general, the survey system 102 facilitates the creation, administration, and collection of survey responses. For example, the survey system 102 enables an administrator, via the administrator client device 106, to create, modify, and run a digital survey that includes free-form opinion text responses. Similarly, the survey system 102 provides electronic surveys to, and collects opinion text responses from, respondents via the respondent client devices 108.

As shown, the survey system 102 includes the response analysis system 104. For example, the response analysis system 104 analyzes opinion text responses using a trained response classification neural network. As mentioned above, the response analysis system 104 can train a response classification neural network using a small-data training dataset that employs word-agnostic vectors based on parts of speech and opinion labels (i.e., response classification labels). Using the trained response classification neural network, the response analysis system 104 can determine response classification labels for portions of text responses to identify targets and opinions corresponding to the text responses.

In some embodiments, the response analysis system 104 is separate from the survey system 102. In one example, the response analysis system 104 and the survey system 102 are separately located on the server device 101. In another example, the response analysis system 104 is located on a separate server device than the survey system 102. In various embodiments, the environment 100 includes the response analysis system 104 and does not include the survey system 102. For example, the response analysis system 104 is located directly on the server device 101 and determines response classification labels for opinion text responses not obtained by the survey system 102.

Although FIG. 1 illustrates a particular arrangement of the server device 101, administrator client device 106, respondent client devices 108, and network 110, various additional arrangements are possible. For example, the administrator client device 106 can directly communicate with the server device 101 hosting the response analysis system 104, bypassing the network 110. Further, while only one administrator client device 106 is illustrated, the environment 100 can include any number of administrator client devices. Similarly, as shown, the environment 100 can include any number of respondent client devices 108.

For reference, as used herein, the terms "opinion text response," "text response," or "response" refers to a string of electronic text. For instance, a text response is a free-form string of text that is provided in response to a prompt, query, question, survey, or experience. Often, a response includes one or more sentences of text (e.g., an input sentence) provided by a respondent via a respondent client device. For example, a respondent answers a survey question regarding their opinion of a product or service they recently experienced (e.g., an opinion text response).

The term "training dataset" refers to a collection of sentences that have been labeled with response classification labels. Often a training dataset is a small-data training dataset that includes only a few thousand sentences (e.g., fewer than 2,500 sentences). The term "response classification label" refers to an opinion label assigned to a word. Examples of response classification labels include, but are not limited to, a target classification label, an opinion classification label, and a neither classification label (e.g., neither a target or an opinion). A "target" refers to an object of an opinion (e.g., a product or service). An "opinion" refers to description or sentiment expressed regarding the target. The term "neither" refers to words in a text response that are neither targets nor opinions. In some embodiments, based on the response classification labels determined for words in a sentence, the sentence can be divided into various portions (e.g., a target portion, an opinion portion, and a neither portion).

Words in a training dataset may be manually labeled. For example, a human may label words in the training dataset as either targets, opinions, or neither. In some embodiments, words that are neither targets nor opinions are unlabeled. For words in unclassified responses (e.g., words in an input sentence), the response analysis system 104 can determine corresponding response classification labels. In particular, the response analysis system 104 can employ a trained response classification neural network to determine response classification labels for words in a response.

The term "response classification neural network" refers to a neural network that can be, or is trained, to accurately determine response classification labels for text responses. In general, a neural network is a subset of a machine-learning algorithm, which constructs and implements algorithms that can learn from labeled training data and make predictions on unlabeled input data. Accordingly, the response classification neural network may operate by building models from example inputs (e.g., training or learning), such as a training dataset, to make data-driven predictions or determinations. In some example embodiments, the response classification neural network includes a bi-directional long short-term memory recurrent neural network.

The response analysis system 104 can train the response classification neural network using word-agnostic vectors corresponding to the training dataset. As used herein, the term "word-agnostic vector" refers to a word vector that omits semantic word information corresponding to the word which it represents. A word-agnostic vector can include linguistic and syntactic information about a word other than semantic information, such as a part of speech information, dependency information, attention information, and sequence information. In addition, a word-agnostic vector (or any word vector) is represented mathematically by numerical values, such as a vector or matrix of numbers.

As used herein, the term "part of speech" refers to a word's syntactic role in a sentence. For example, the term "part of speech" refers to a category to which a word is assigned in accordance with the word's syntactic functions. Largely, a part of speech indicates how a word functions in meaning as well as grammatically within a sentence. Examples of parts of speech in English include, but are not limited to noun, pronoun, verb, adverb, adjective, conjunction, preposition, and interjection. Parts of speech can include additional and/or sub-parts of speech. For example, in English, there are around 50 different part of speech categories. While other languages may differ in the number of classified parts of speech (e.g., a number of languages employ twelve unique parts of speech), the total number is often relatively small (e.g., fewer than 100 parts of speech).

Turning now to FIGS. 2A-5, additional detail is provided regarding training and employing a response classification neural network. To illustrate, FIGS. 2A-2D show example flow diagrams of training a response classification neural network to determine response classification labels. In particular, FIGS. 2A-2D show actions performed by the response analysis system 104 to train a response classification neural network.

Figure 2A:
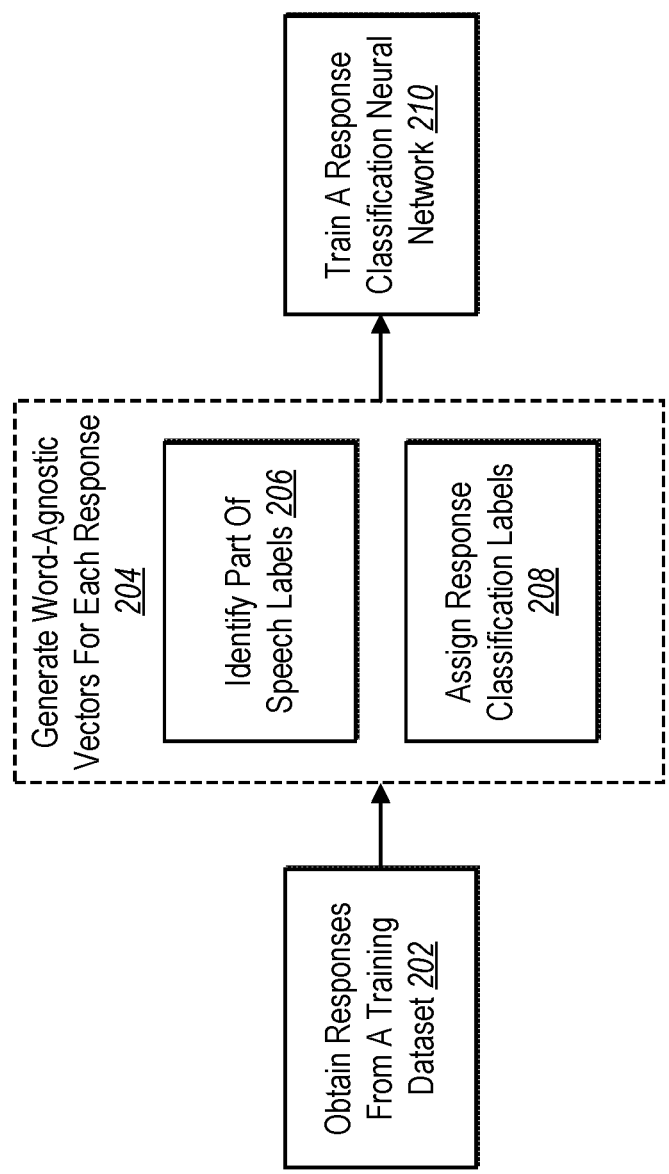
FIG. 2A-2D illustrate example flow diagrams of training a response classification neural network to determine response classification labels in accordance with one or more embodiments.

As illustrated in FIG. 2A, the response analysis system 104 obtains responses from a training dataset 202. In one or more embodiments, the response analysis system 104 accesses a database or storage location that includes responses that are labeled with response classification labels (e.g., target, opinion, neither). For example, the survey system 102 and/or an administrator (e.g., via an administrator client device) provides the training dataset to the response analysis system 104. In some embodiments, the response analysis system 104 obtains the training dataset from a remote location, such as a third-party computing device.

As mentioned previously, the training dataset can be a small-data training dataset that includes a few thousand sentences that are tagged, labeled, and/or annotated with response classification labels (e.g., target, opinion, and/or neither). The training dataset can relate to any subject matter that corresponds to respondents expressing their opinion in a text response. For example, the training dataset can be obtained from a previous survey. Alternatively, the training dataset can be manually generated or compiled by an administrator.

Upon obtaining the training dataset, the response analysis system 104 generates 204 word-agnostic vectors for the words in the training dataset. As described above, a word-agnostic vector does not include semantic word information, but includes other syntactic, sequence, and word pattern information. By ignoring words (i.e., not employing the semantic meaning of words themselves), the response analysis system 104 can train a response classification neural network using a much smaller training dataset than conventional systems as well as avoid a host of other problems, as detailed above.

As shown, generating word-agnostic vectors includes identifying 206 parts of speech labels for each response. In one or more embodiments, the training dataset includes tags, labels, and/or annotations for the part of speech assigned to each word. In some embodiments, the response analysis system 104 automatically determines the parts of speech of each word for each sentence in the training dataset. For example, the response analysis system 104 employs a separate machine-learning algorithm and/or process to identify the parts of speech associated with each word. For instance, the response analysis system 104 inputs a sentence from the training dataset into a machine-learning algorithm and receives output indicating the part of speech associated with each word.

Using the part of speech assigned to a word, the response analysis system 104 can construct a word-agnostic vector for the word. For example, the response analysis system 104 can uniquely indicate the part of speech assigned to a word using one or more numerical values. For instance, if the response analysis system 104 employs a neural network (e.g., a machine-learning algorithm) to determine parts of speech, the response analysis system 104 can use the latent representation output from an intermediary layer or node of the neural network to form the word-agnostic vector for the word.

While the present disclosure describes one or more embodiments of the response analysis system 104 using English words and parts of speech, employing other languages are possible. For example, using the same methods and techniques disclosed herein, the response analysis system 104 can train and employ a response classification neural network in any language that includes identifiable parts of speech, including languages that do not use the Roman alphabet.

As also shown in FIG. 2A, generating 204 word-agnostic vectors includes assigning 208 response classification labels to each response. As mentioned above, words in the training dataset are associated with one or more response classification labels, such as a target classification label, an opinion classification label, or a neither classification label. In one or more embodiments, the response analysis system 104 converts (e.g., encodes for the purpose of training) the response classification label for a word to a numerical value such that the numerical value can be incorporated into the word-agnostic vector for the word. For instance, the response analysis system 104 uses a lookup table to identify one or more numbers associated with a response classification label for a word and adds, multiplies, or otherwise incorporates the one or more numbers to the word-agnostic vector that indicates the part of speech for the word.

In other embodiments, the response analysis system 104 generates a separate word-agnostic vector for each word in the training dataset. For example, for a particular word in a sentence of a response in the training dataset, the response analysis system 104 generates a first word-agnostic vector that numerically indicates the word's part of speech and a second word-agnostic vector that numerically indicates the word's response classification label. In these embodiments, the response analysis system 104 inputs both word-agnostic vectors for the particular word to the response classification neural network as input to train the response classification neural network.

FIG. 2A illustrates the response analysis system 104 training 210 a response classification neural network. For instance, as just mentioned, the response analysis system 104 provides the generated word-agnostic vectors for each word in the training dataset as input to train the response classification neural network 210. As mentioned above, the response classification neural network uses word-agnostic vectors to constructs logical connections that enable the classification neural network to make predictions on input data (e.g., an input sentence).

In one or more embodiments, the response classification neural network is a bi-directional long short-term memory (LSTM) recurrent neural network (RNN). In some embodiments, the response classification neural network is another type of neural network or machine-learning algorithm. In many embodiments, the trained response classification neural network indicates distances between parts of speech (or parts of speech patterns) associated with two word-agnostic vectors. The shorter the distances between two parts of speech (or parts of speech patterns) are within the trained multidimensional parameter space, the higher the probability of a matching response classification label.

In various embodiments, the response analysis system 104 employs sequence training while training the response classification neural network. For instance, sequence training includes using one or more previous words (i.e., word-agnostic vectors) in a sentence when learning language patterns for subsequent words in the sentence. RNNs, in particular, employ sequence learning to learn and recognize patterns in sequences of data (i.e., terms and words).

As mentioned above, the response analysis system 104 employs a small-data training dataset to train the response classification neural network. One reason why the response analysis system 104 can use a training dataset that is significantly smaller than the training dataset of conventional systems is because the number of parts of speech is relatively small. In the most general cases, the English language includes roughly 50 parts of speech or less. In any case, the total number of parts of speech is minor compared to the learned data of conventional systems (e.g., greater than 200,000 unique English words).

Because the number of parts of speech is small, the resulting learned parameter space of a response classification neural network is also small. Further, because the number of parts of speech is small, the response classification neural network needs very few rules to develop the learned parameter space. Accordingly, the complexity of the response classification neural network is greatly reduced and the computational and storage requirements needed to train and employ the response classification neural network is also significantly reduced compared to conventional systems.

In additional embodiments, the response analysis system 104 can employ a loss function. For instance, the response analysis system 104 uses a loss function such as cross-entropy loss, based on the word-agnostic vectors to train a softmax classifier to classify word-agnostic vectors using the learned parameter space of the response classification neural network. Indeed, the softmax classifier is the final layer or node in the response classification neural network that yields probability scores for each response classification label. In some embodiments, the response analysis system 104 inputs a determined response classification label back into the response classification neural network for further training, until the response classification neural network predicts accurate response classification labels. In addition, the response analysis system 104 can perform other evaluations techniques to ensure that a trained response classification neural network produces accurate results.

Once the response analysis system 104 trains the response classification neural network, the response analysis system 104 can use the trained response classification neural network to determine labels for responses that include the opinions of respondents. In general, the response analysis system 104 can employ the trained response classification neural network to determine response classification labels for future responses. Additional description regarding employing a trained response classification neural network is provided below with respect to FIG. 3.

Figure 2B:
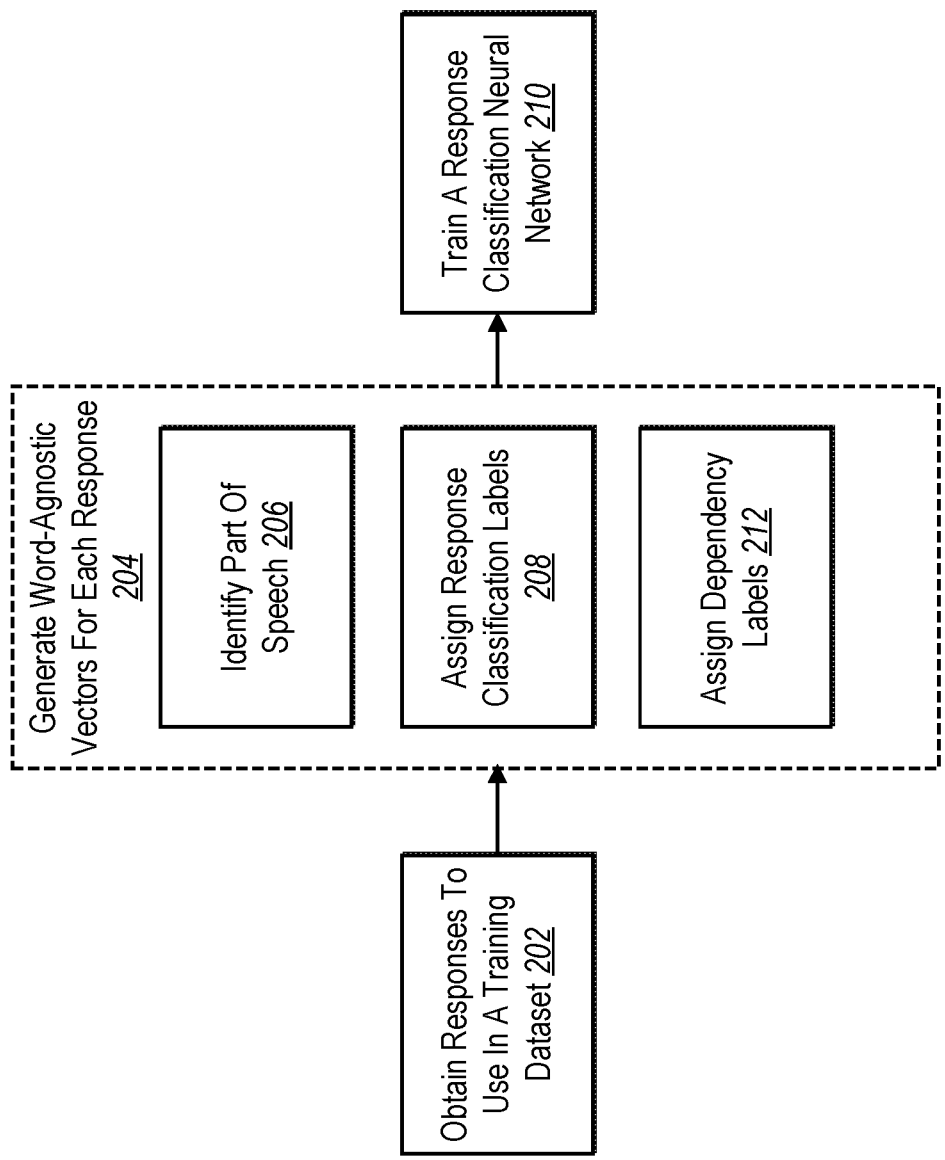
Figure 2C:
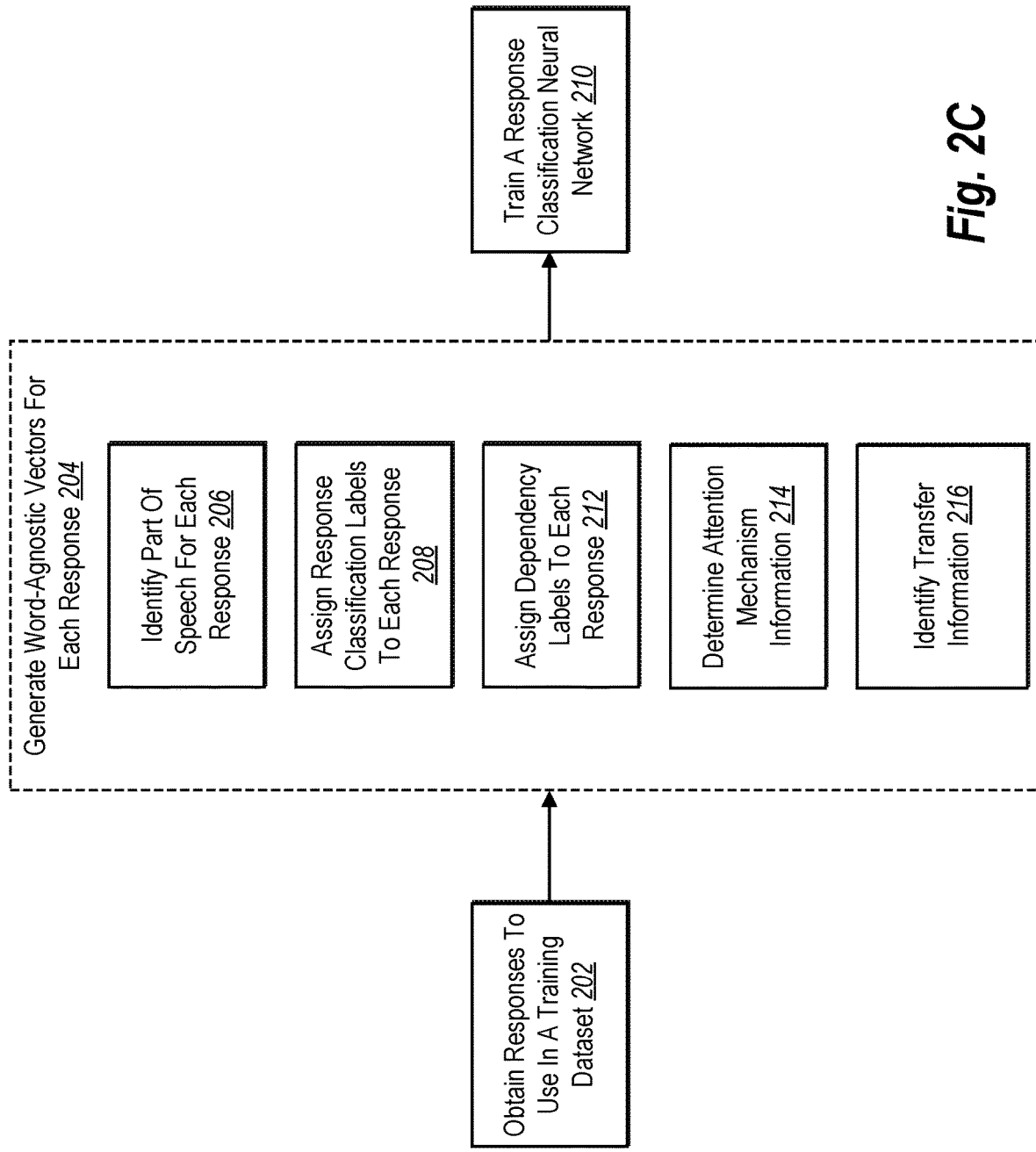
Figure 2D:
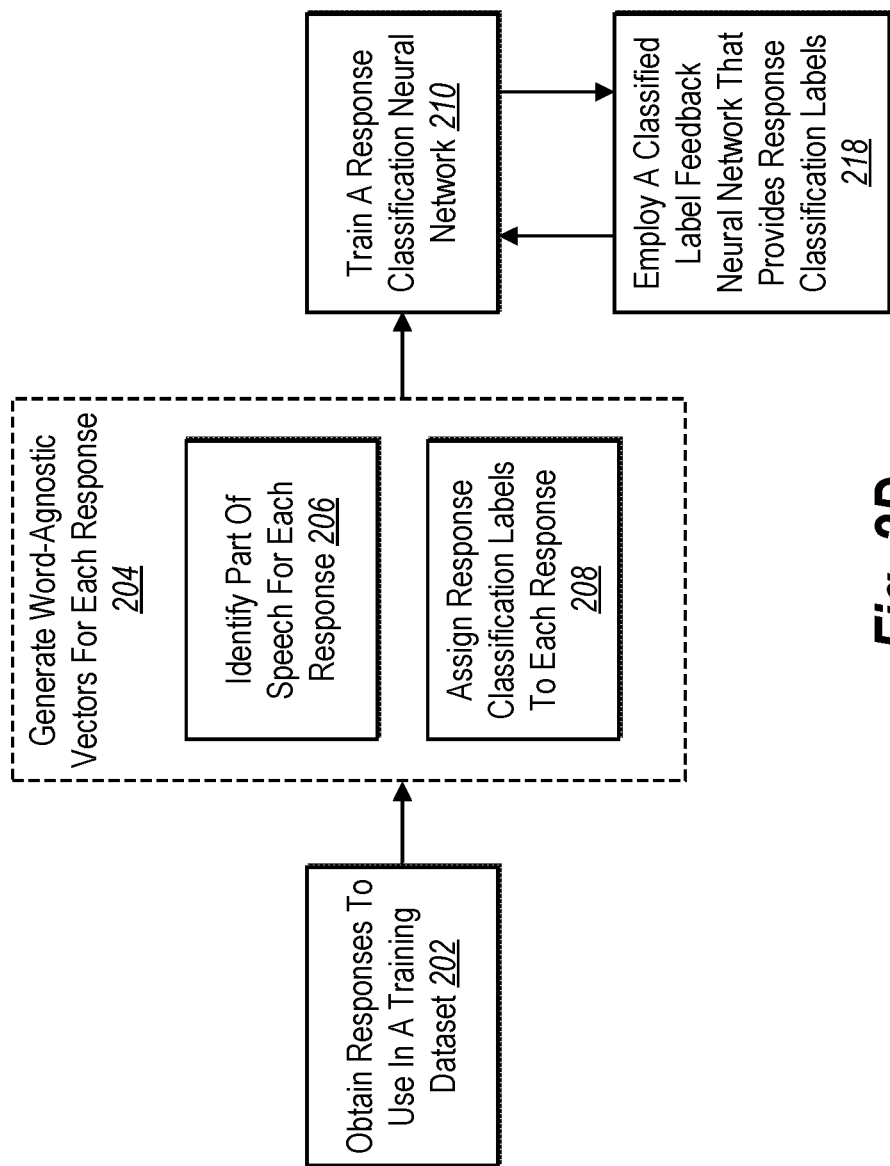

FIGS. 2B-2D show additional embodiments employed by the response analysis system 104 to train the response classification neural network. To illustrate, in FIG. 2B, the response analysis system 104 generates additional vector information for each word in the training dataset. For example, in one or more embodiments, the response analysis system 104 generates an additional word-agnostic vector for each word based on dependency information corresponding to the word. In some embodiments, the response analysis system 104 supplements an existing word-agnostic vector for a word with the additional dependency information.

As shown in FIG. 2B, the response analysis system 104 assigns 212 dependency labels to each response in the training dataset. Dependency labels can include a set of labels or annotations that indicate the structure or hierarchy of words in a sentence. Similar to parts of speech, the response analysis system 104 can identify and/or generate dependency labels for words in a sentence that provide word-agnostic information about the word. Examples of dependency labels include, but are not limited to, root, subject, particle, determiner, adjective pronoun, prepositional object, direct object, expletive, dependent clause, conjunct, coordinating conjunction, and separated verb prefix.

In some embodiments, the response analysis system 104 employs a separate neural network or other machine-learning algorithms to determine the dependency label for each word in the training dataset. Further, as described above, the response analysis system 104 can convert the dependency label into one or more numerical values as part of generating one or more word-agnostic vectors for each word.

As with parts of speech, the total number of dependency labels is also relatively small (e.g., approximately 50). Accordingly, adding addition word-agnostic vectors for each word corresponding to the word's dependency label or supplementing the word's existing word-agnostic vector with the dependency label information does not significantly impact the size of the learned parameter space of the response classification neural network. For example, in the case that each word had a separate word-agnostic vector for a part of speech label and a dependency label, the learned parameter space would roughly double in size (e.g., 50 parts of speech+50 dependencies) rather than multiply in size (e.g., 50 parts of speech×50 dependencies), which is still significantly smaller than conventional systems.

As a note, because the response classification neural network employs word-agnostic vectors to recognize patterns, it is trivial that the same word can have different parts of speech or different dependencies. Stated differently, the response classification neural network learns language patterns, based on parts of speech and/or dependencies for a sentence, that correspond to the response classification label assigned to the sentence. Thus, if the same word is used as a different part of speech in two different sentences in the training dataset, the response analysis system 104 ignores the semantics of the word and uses only the corresponding part of speech (or other word-agnostic information) when training (and employing) the response classification neural network.

As shown in FIG. 2C, as part of generating 204 word-agnostic vectors, the response analysis system 104 also determines 214 attention mechanism information. In general, attention mechanism information provides information to the response classification neural network to learn the likelihood of importance, for a word in a sentence, with respect to other words in the sentence. In this manner, the response classification neural network can generate a weighted representation of each sentence, which can enable, in some cases, the response analysis system 104 to improve performance and interpretability of the response classification neural network.

The response analysis system 104 can employ attention mechanism information in one or more embodiments to help the response classification neural network properly connect words labeled with an opinion classification label with a corresponding target classification label. In sentences where only one target classification label and one opinion classification label are identified, the response classification neural network can easily connect or pair the two labels together. However, longer sentences can include multiple target classification labels and multiple opinion classification labels. Thus, rather than using simple heuristics (e.g., proximity or chronological order), which are often inaccurate, attention mechanism information can enable the response analysis system 104 to accurately disambiguate or separate a particular target associated with a particular opinion. Additional description regarding determining attention mechanism information for each response is provided below in connection with FIG. 4B.

As also shown in FIG. 2C, as part of generating 204 word-agnostic vectors, the response analysis system 104 also identifies 216 transfer information. Transfer information refers to vector information that is particular to a set of responses. For instance, transfer information includes vector information for words that are customized, particularly specific, and/or highly peculiar. Examples transfer words include brand names, words with embedded numbers, peculiar terms of art, and/or an entity's name. Transfer words can be tagged with a response classification label. In addition, transfer words can also be annotated with a part of speech label, dependency label, and/or other word-agnostic vector information. As with the generated word-agnostic vectors, the response analysis system 104 can input word-agnostic vectors for transfer words into the response classification neural network to train the response classification neural network.

In some embodiments, in addition to word-agnostic information, transfer words can include semantic information. For example, the response analysis system 104 provides a separate word vector (e.g., a semantic word vector) to the response classification neural network that semantically identifies a transfer word along with its corresponding word-agnostic vector(s). In this manner, the response classification neural network can train to recognize the specific set of transfer words along with their corresponding word-agnostic information, which prevents the response classification neural network from mislabeling transfer words in future responses.

While not shown, the response analysis system 104 can generate and/or provide additional word-agnostic vector information as input to train the response classification neural network. For example, the response analysis system 104 provides double propagation labels for each word in the training dataset. Further, in some embodiments, the response analysis system 104 also provides semantic word information for one or more words in the training dataset.

FIG. 2D illustrates the response analysis system 104 training a response classification neural network based on multiple neural networks. As shown, FIG. 2D includes the response classification neural network trained in FIGS. 2A-2C. In addition, FIG. 2D shows employing 218 a classified label feedback neural network (or simply feedback neural network) that provides response classification labels to the response classification neural network. In one or more embodiments, the feedback neural network is a bi-directional long short-term memory recurrent neural network.

As shown, the response analysis system 104 employs the feedback neural network in connection with training the response classification neural network. For example, when the response classification neural network determines a classification label for a word in a sentence, the feedback neural network provides the determined classification label back to the response classification neural network when analyzing subsequent words in the same sentence. In this manner, the feedback neural network ensures that the response classification neural network identifies at least one target classification label and one opinion classification label for each sentence. Indeed, the feedback neural network prevents hanging targets/opinions (e.g., sentences that include a target classification label without an opinion classification label, or vice versa). Additional description regarding the feedback neural network is provided with respect to FIG. 5.

FIGS. 2A-2D illustrate various embodiments for generating word-agnostic vectors and training a response classification neural network. While particular arrangements are shown, the response analysis system 104 can employ alternative arrangements. For example, the response analysis system 104 generates word-agnostic vectors using parts of speech labels, response classification labels, and transfer information. In another embodiment, the response analysis system 104 generates word-agnostic vectors using parts of speech labels, response classification labels, and attention mechanism information. Additionally, with each possible combination of generating word-agnostic vectors, the response analysis system 104 can employ the feedback neural network and/or additional neural networks.

Figure 3:
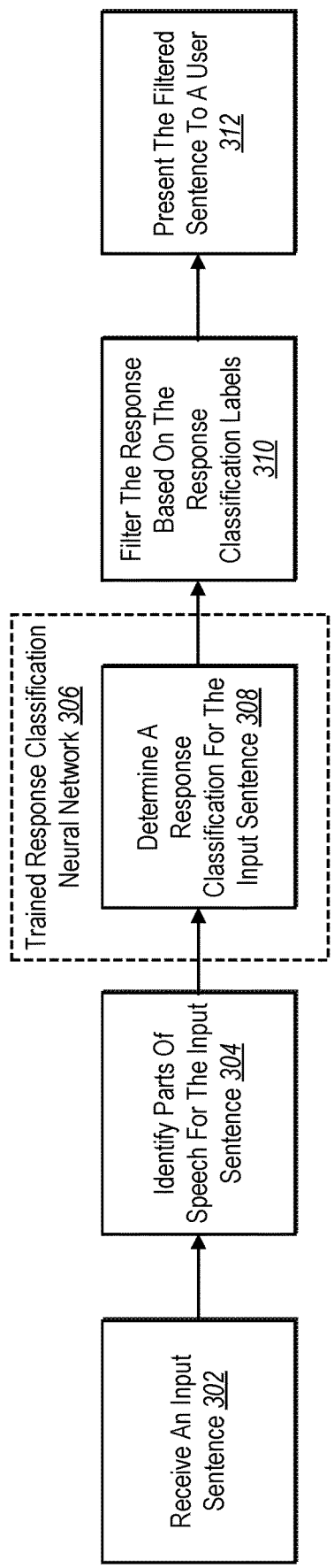
FIG. 3 illustrates an example flow diagram of employing a trained response classification neural network to determine response classification labels for an input sentence in accordance with one or more embodiments.

FIG. 3, as mentioned above, illustrates a flow diagram of employing the trained response classification neural network to determine response classification labels for an input sentence. For instance, the trained response classification neural network can be the response classification neural network trained in connection with FIGS. 2A-2D.

As shown in FIG. 3, the response analysis system 104 receives 302 an input sentence. For instance, the response analysis system 104 receives a response from a survey system that includes one or more input sentences where respondents express their opinions regarding a product service, person, or any other topic. In other instances, the response analysis system 104 receives a batch of responses that each includes one or more input sentences expressing opinions (e.g. survey responses). For each sentence in the response, the response analysis system 104 can determine response classification labels, as detailed below.

Upon receiving the input sentence, the response analysis system 104 identifies 304 parts of speech for the input sentence. For instance, the response analysis system 104 automatically analyzes the input sentence to identify parts of speech for each word in the input sentence of a response, as described above. In some embodiments, the response analysis system 104 employs a trained neural network or another trained machine-learning algorithm to identify various parts of speech in the input sentence.

In one or more embodiments, the response analysis system 104 generates a word-agnostic vector for each word in the input sentence. For example, the response analysis system 104 employs the same actions, methods, and/or techniques, as described above with respect to generating a word-agnostic vector for sentences in the training dataset, to generate a word-agnostic vector for words in the input sentence. In this manner, the word-agnostic vectors are analogous between words and sentences the response analysis system uses to train the response classification neural network and input words and input sentences.

In additional embodiments, the response analysis system 104 determines additional vector information for one or more words in the input sentence. For example, the response analysis system 104 determines and incorporates dependency labels for words in the input sentence. Additionally, or alternatively, the response analysis system 104 determines attention mechanism information and/or double propagation label information for words in the input sentence.

Upon identifying the parts of speech (e.g., word-agnostic vectors) for words in the input sentence, the response analysis system 104 employs the trained response classification neural network 306 to determine 308 response classifications (i.e., response classification labels) for the input sentence. In particular, the response analysis system 104 employs the trained response classification neural network 306 to predict a response classification score for each word in the input sentence that indicates a proper response classification label.

In general, the response analysis system 104 employs the same word-agnostic vectors used to train the response classification neural network (e.g., training) as it the does for determining response classification labels of an input sentence using the trained response classification neural network. For example, the vector information included in the word-agnostic vectors generated for training match to the word-agnostic vector information generated for application on input sentences. However, in some embodiments, the response analysis system 104 employs different pieces of vector information between training and application. For instance, the response analysis system 104 generates word-agnostic vectors that include all of the vector information shown in FIG. 2C for training, but generates word-agnostic vectors that only include parts of speech information for application, or vice versa.

Likewise, the response analysis system 104 can employ the second feedback neural network during application (i.e., when determining response classification labels for words in the input sentence). In a similar manner as described above, the feedback neural network can ensure that the response classification neural network determines both a target classification label and an opinion classification label for the input sentence. Additional description regarding the second feedback neural network is provided with respect to FIG. 5.

Further, as mentioned above, the trained response classification neural network 306 is domain-agnostic. In other words, even if the input response corresponds to opinions for Product X and the trained response classification neural network 306 was trained based on opinions responses for Service Y, the trained response classification neural network 306 can still determine accurate response classification labels because it is word-agnostic. In this manner, the response analysis system 104 can employ the trained response classification neural network 306 even if little or no training data exist for a particular product, service, or entity.

As also mentioned above, the trained response classification neural network 306 outputs response classification labels for one or more words in the input sentence. In one or more embodiments, the trained response classification neural network 306 only outputs words that have a classification label of target or opinion. Similarly, the trained response classification neural network 306 can ignore or omit words that are labeled with a neither classification label. In some embodiments, the response analysis system 104 can provide the trained response classification neural network 306 with instructions (e.g., based on user input) to selectively output (or ignore) words in the input sentence with certain response classification labels.

As shown in FIG. 3, the response analysis system 104 filters 310 responses based on the response classification labels determined for each word in the input sentence. For example, the response analysis system 104 filters the input sentence to include only words labeled with target classification labels and opinion classification labels. Indeed, the response analysis system 104 can filter the input sentence to include a target portion (e.g., words classified as targets) and an opinion portion (e.g., words classified as opinions) or other selected portions. In addition, if the input sentence includes multiple pairs of targets and opinions, the response analysis system 104 can separate the words corresponding to each target/opinion pair.

Moreover, as shown, the response analysis system 104 presents 312 the filtered sentence to a user, such as an administrator. For example, the response analysis system 104 presents the filtered sentence in the format "target: opinion" to the user. In other examples, the response analysis system 104 provides a graphical user interface that enables the user to see both a filtered version as well as an unfiltered version of the input sentence. Additional description regarding providing filtered responses to a user (e.g., via an administrator device) is described below with respect to FIG. 6.

In one or more embodiments, the response analysis system 104 also provides one or more graphical elements that allow the user to provide feedback regarding the response classification labels. For example, the user can approve the response classification labels provided by the response analysis system 104. Alternatively, the user provides corrections to one or more response classification labels (e.g., modifies the response classification label from neither to opinion). The response analysis system 104 can use the corrections to further train and update the response classification neural network.

In addition to providing the filtered response to the user, in one or more embodiments, the response analysis system 104 uses the responses with the response classification labels to further analyze, classify, organize, and/or process the responses. For example, for each target, the response analysis system 104 determines statistics regarding positive, negative, and neutral opinions. In another example, the response analysis system 104 ranks the most common opinions for one or more targets. In other examples, the response analysis system 104 arranges filtered responses based on target and/or opinion.

As described above, the response analysis system 104 trains a response classification neural network using sentences from a training dataset. In addition, the response analysis system 104 employs the trained response classification neural network to determine response classification labels for input sentences. To further describe how the response analysis system 104 both trains and employs a response classification neural network, FIGS. 4A and 4B illustrate characteristic tables for a text response.

As shown, FIG. 4A includes a first response characteristics table 410 and FIG. 4B includes a second response characteristics table 420. Both the first response characteristics table 410 and the second response characteristics table 420 include the response 412, 422 with the words, "Acme had really good service."

As shown in FIG. 4A, the first response characteristics table 410 includes a parts of speech label 414 and a response classification label 416 for each word of the response 412. Based on the response, the response analysis system 104 can identify the parts of speech label 414 for each word in the response, as described above. If the response 412 was part of the training dataset used to train a response classification neural network, the response analysis system 104 identifies the response classification label 416 for each word from the training dataset. Alternatively, if the response 412 was from an input sentence, the response analysis system 104 uses the trained response classification neural network to determine the response classification label for each word, as described above.

To illustrate, suppose the response analysis system 104 employed the response 412 to train a response classification neural network. Accordingly, the response analysis system 104 obtains the parts of speech labels and response classification labels for each word in the response 412 and generates word-agnostic vectors for each word in the response 412. Additionally, the response analysis system 104 ignores the words themselves of the response 412. Accordingly, the response analysis system 104 generates word-agnostic vectors that represent the pattern: proper noun/neither, verb/neither, adverb/opinion, adjective/opinion, and noun/target. Using the combinations of parts of speech labels 414 and response classification labels 416 (and any other provided vector information), the response analysis system 104 trains the response classification neural network, as described above.

Now suppose the response 412 is an input sentence from an opinion text response. As mentioned above, the response analysis system 104 identifies the parts of speech labels for each word in the sentence (e.g., in the form of a word-agnostic vector). The response analysis system 104 again ignores the words and provides the parts of speech labels to the trained response classification neural network. Accordingly, the response analysis system 104 inputs the response to the trained response classification neural network using the pattern: proper noun, verb, adverb, adjective, and noun.

The trained response classification neural network processes the input pattern to determine scores that indicate a response classification label for each word of the response 412 (e.g., using a softmax classifier loss function). In particular, based on the determined scores, the response analysis system 104 employs the trained response classification neural network to output classification labels of: neither, neither, opinion, opinion, target. The response analysis system 104 then associates the output with each corresponding word in the response 412.

As mentioned above, in some embodiments, the response analysis system 104 filters responses to a target portion and an opinion portion. To illustrate, the response analysis system 104 can filter the response 412 as target: "services" and opinion: "really good." As another example, the response analysis system 104 can filter the response 412 using the "target: services" format as "services: really good." Additional description regarding providing filtered responses to a user is described below with respect to FIG. 6.

FIG. 4B, as mentioned above, provides an example of the response analysis system 104 determining attention mechanism information for a sentence of a response. As shown, the second response characteristics table 420 includes the response 422 having the words of "Acme had really good service." In addition, the second response characteristics table 420 includes a most attended word 424. The response analysis system 104 can determine the most attended word 424 for each word in the response 422. As with FIG. 4A, the response analysis system 104 can determine the most attended word 424 to a sentence in the training dataset or an input sentence.

As described above, the response analysis system 104 can provide attention mechanism information (e.g., a numerical indication of the most attended word 424) to the response classification neural network within a word-agnostic vector. As also described above, attention mechanism information can assist a response classification neural network in disambiguating or separating connected targets and opinions when a sentence includes multiple targets and multiple opinions.

In one or more embodiments, the response analysis system 104 determines the most attended word 424 for a word in the response by employing an attention mechanism matrix. For instance, the response analysis system 104 generates or otherwise obtains the attention mechanism matrix. In some embodiments, the response analysis system 104 trains an attention mechanism matrix to map opinions to targets. In this manner, the attention mechanism matrix provides weights that not only indicate what other word in a sentence the response classification neural network should focus on given an input word (e.g., the most attended word 424 for each input word), but also the likelihood that the words form a target that connects to an opinion (e.g., a target and opinion pair).

Using the trained or otherwise obtained attention mechanism matrix, the response analysis system 104 calculates weighted scores for each pair of words in an input sentence. For example, the response analysis system 104 multiplies the word vectors of each word in the pair by the attention mechanism matrix to obtain a weighted score (e.g., Word Vector 1×Attention Mechanism Matrix×Word Vector 2=Weight). The response analysis system 104 can then apply the weighted score to one or more words in the word pair.

To illustrate, given the input word "really" in the response 422, the response analysis system 104 first identifies each word pairing (e.g., really: Acme, really: had, really: good, and really: services). For each word pairing, the response analysis system 104 applies the attention mechanism matrix to the corresponding word vectors. Based on the weighted scores, the response analysis system 104 determines that the most attended word 424 for the word "really" is "services." In some embodiments, as mentioned above, the most attended word pairing can indicate a connection between a target word and an opinion word (e.g., "really" is an opinion and "service" is the target). The response analysis system 104 can repeat the process to determine the most attended word 424 for each word in the response 422.

As mentioned above, the response analysis system 104 can also apply the corresponding weighted score based on the most attended word 424. For instance, in one or more embodiments, the response analysis system 104 weights one or more of the word-agnostic vectors for the word "really" based on the weighted score (e.g., a score between 0-1) with the corresponding most attended word 424 of "services." In other embodiments, the response analysis system 104 weights one or more of the word-agnostic vectors for the word "really" based on each weighted score between the word "really" and each other word in the response 422.

By employing the attention mechanism matrix, the response analysis system 104 can achieve a weighted representation for words in the response 422. Further, the response analysis system 104 can input the weighted representation of the response 422 (e.g., attention mechanism information for each word in the response 422) to the response classification neural network to enable the response classification neural network to better disambiguate target/opinion pairs when a sentence includes multiple target/opinion pairs.

Figure 5:
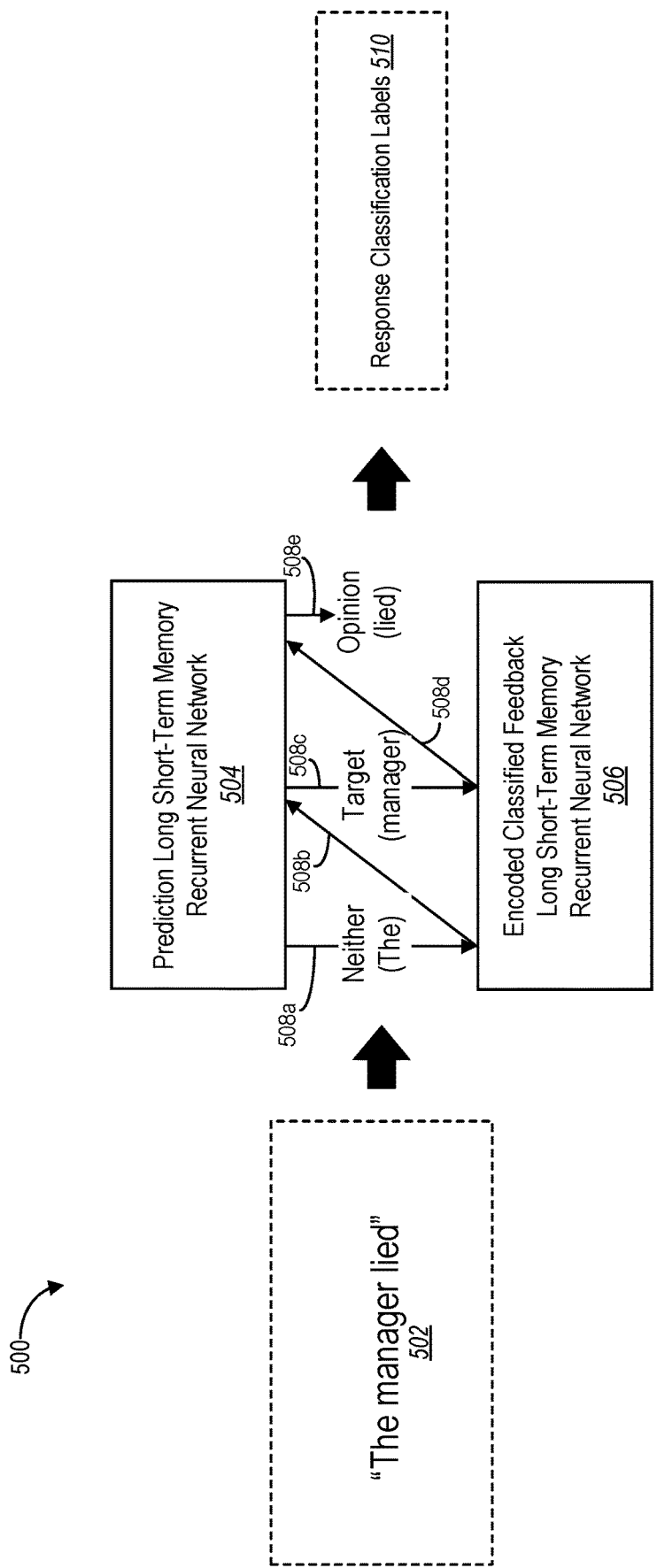
FIG. 5 illustrates an example flow diagram of employing multiple neural networks to determine response classification labels for an input sentence in accordance with one or more embodiments.

FIG. 5 illustrates a flow diagram 500 of employing multiple neural networks to determine response classification labels for an input sentence in accordance with one or more embodiments. As mentioned above, the response analysis system 104 can employ the response classification neural network and an additional neural network, such as a feedback neural network, when determining response classification labels for words in a sentence. Indeed, the response analysis system 104 can employ multiple neural networks either during training and/or when determining response classification labels for input sentences.

As also mentioned above, in one or more embodiments, the response analysis system 104 employs multiple neural networks to prevent the creation of hanging targets/opinions in a sentence (e.g., a sentence that includes a target classification label without an opinion classification label, or vice versa). In rare instances, a single neural network may not factor in determinations (e.g., determined response classification labels) for previous words in the sentence, which can lead to the neural network not identifying both a target and a corresponding opinion for the sentence.

To illustrate, FIG. 5 includes an input sentence 502 of "the manager lied." In this sentence, the word "lied" is a verb. Because it is uncommon for verbs to be wholesale opinions, the response classification neural network may output the response classification labels for the input sentence 502 as: neither, target, neither. In this case, the sentence has a hanging target classification label with no corresponding opinion.

To remedy this issue, FIG. 5 also shows a prediction long short-term memory recurrent neural network 504 (or simply "prediction neural network 504") and an encoded classification feedback long short-term memory recurrent neural network 506 (or simply "encoded feedback neural network 506"). The prediction neural network 504 can be one or more embodiments of the response classification neural network described above. Similarly, the encoded feedback neural network 506 can be one or more embodiments of the feedback neural network described above.

The response analysis system 104 can provide the input sentence 502 (e.g., parts of speech corresponding to words in the sentence) to the prediction neural network 504, as described above. For the first word in the input sentence 502 (i.e., "the") the prediction neural network 504 determines the response classification label of neither. For example, the prediction neural network 504 has been trained to recognize "the" (e.g., definite articles) or "a" (e.g., indefinite articles) at the beginning of a sentence as neither a target nor an opinion.

As shown, the prediction neural network 504 outputs 508a the response classification label encoded as "neither" for the word "the" to the encoded feedback neural network 506. The encoded feedback neural network 506 receives the response classification label as input and provides 508b the response classification label back to the prediction neural network 504. In particular, the encoded feedback neural network 506 provides a corresponding encoder latent vector for the word that indicates the encoder's state (e.g., the word's forwards and backwards context) back to the prediction neural network 504. In some embodiments, the encoded feedback neural network 506 only outputs a response classification label when the classification label is either a target or an opinion.

The prediction neural network 504 then determines a response classification label for the word of "manager." As part of determining the response classification labels, the prediction neural network 504 factors in the response classification labels determined for previous words in the sentence (e.g., based on the provided encoder state mentioned above). In particular, the prediction neural network 504 is looking for either a target classification label or an opinion classification label, such that the prediction neural network 504 can complete the target and opinion pair. In this case, the neither classification label does not affect the response classification determination for the word "manager," which the prediction neural network 504 determines to be a target.

Again, the prediction neural network 504 outputs 508c the response classification label encoded as "target" for the word "manager" to the encoded feedback neural network 506. The encoded feedback neural network 506 receives the response classification label as input and provides 508d the response classification label back to the prediction neural network 504. When the prediction neural network 504 encodes the last word (i.e., "lied") in the input sentence 502, the prediction neural network 504 recognizes that the sentence includes a target, but no opinion. Accordingly, the prediction neural network 504 determines if the last word (e.g., based on the word's part of speech) in the input sentence 502 could serve as an opinion.

As shown, the prediction neural network 504 determines and outputs 508e the response classification labels encoded as "opinion," along with the other response classification labels 510 for the input sentence. In this manner, the response analysis system 104 employs both the prediction neural network 504 and the encoded feedback neural network 506 to ensure a pairing between a target and an opinion. Indeed, employing the multiple neural networks, as described herein, reduces sentences with hanging classification labels from about 10% to (e.g., 40-70 per 1,000 sentences) less than 1% (2-5 per 1,000 sentence) based the inventor's analysis of the response analysis system employing the multiple neural networks as described above.

Figure 6:
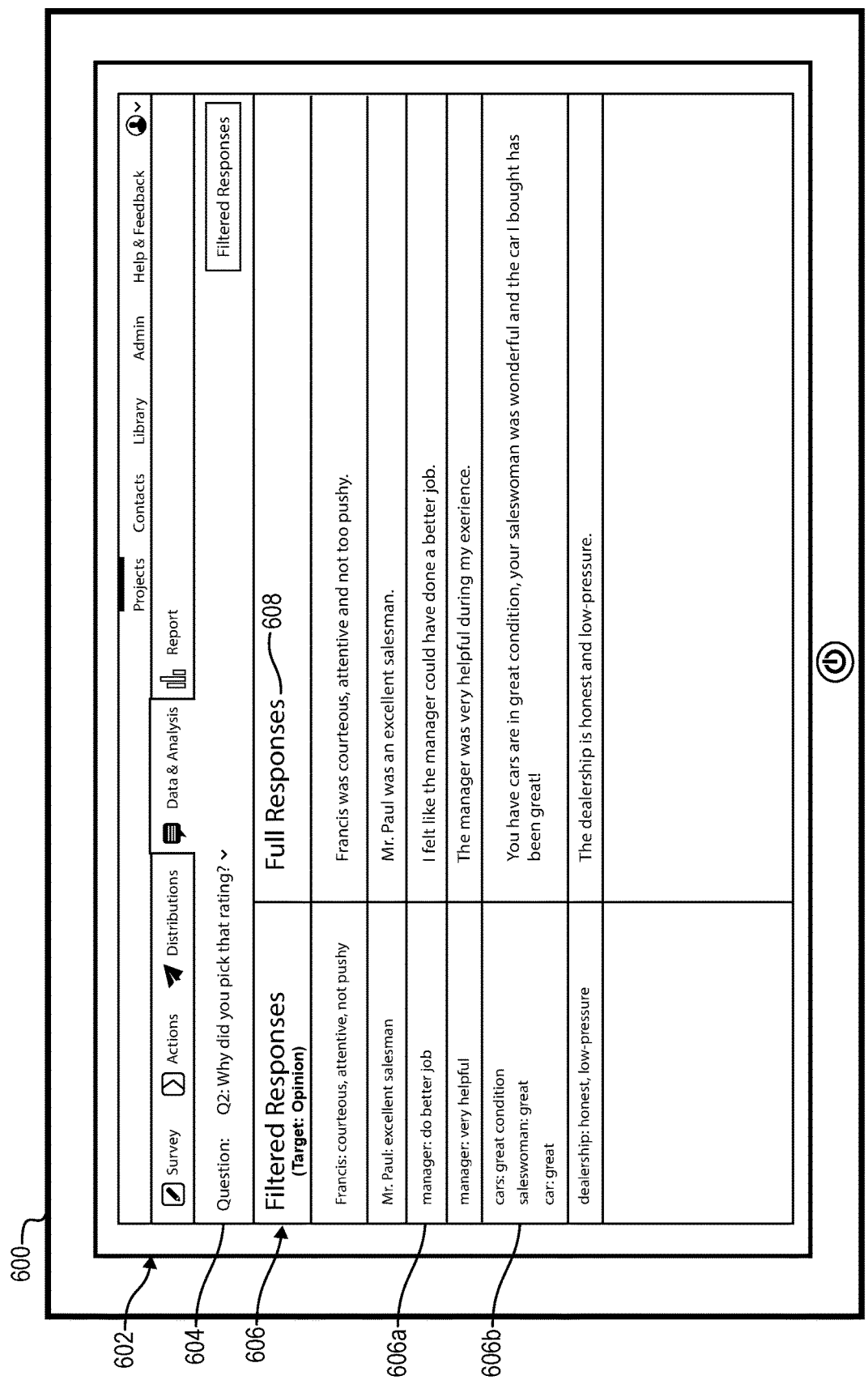
FIG. 6 illustrates an example graphical user interface for presenting filtered opinion responses in accordance with one or more embodiments.

Turning now to FIG. 6, additional description is provided regarding presenting filtered responses to a user, as mentioned above. In particular, FIG. 6 illustrates a graphical user interface for presenting filtered opinion responses. As shown, FIG. 6 includes a client device 600 that displays a graphical user interface 602. In one or more embodiments, the response analysis system 104 provides the graphical user interface 602, which can be displayed to an administrator via an administrator client device. In some embodiments, as described previously, the response analysis system 104 is part of a survey system that facilitates the creation, administration, and collection of surveys.

As shown, the graphical user interface 602 includes a prompt or survey question 604 given to multiple respondents. The responses shown in the graphical user interface 602 correspond to the survey question 604 (e.g., feedback at a car dealership). For instance, the graphical user interface 602 includes a list of filtered responses 606 and a corresponding list of full responses 608 (i.e., non-filtered responses).

The filtered responses 606 employ the format of "target: opinion." In other words, each response in the list of filtered responses 606 displays a target portion and a corresponding opinion portion. In this manner, an administrator can quickly, clearly, and easily assess the relevance of a respondent's opinion without needing to read the entire response. However, if the administrator needs to read the entire response, the full response is provided adjacent to the filtered response in the list of full responses 608.

To illustrate, the third filtered responses 608a reads "manager: do better job," which is quicker to read and coveys the same message as the full response. As another example, the fifth filtered responses 606b identifies three pairs of targets and opinions. In this example, the response analysis system 104 presents each target/opinion pair separately, which enables the administrator to extract valuable information from the response much more quickly and effortlessly than having to read the full response, manually identify the multiple targets and opinions, and mentally separate each pair. Additionally, the response analysis system 104 can treat each target/opinion pair separately when processing, analyzing, and grouping opinions, as described below.

In one or more embodiments, the response analysis system 104 provides additional graphical user interfaces to an administrator. For example, the response analysis system 104 provides a list of identified targets for one or more survey questions 604. The response analysis system 104 can sort the list of targets by alphabetical order, chronological order, manually ordered, or by any number of ordering criteria. In addition, the response analysis system 104 can list each of the opinions that correspond to the target adjacent to the target, or vice versa. To illustrate, for the target of "manager," the response analysis system 104 lists the opinions of "do better job" and "very helpful."

In some embodiments, the response analysis system 104 provides a graphical user interface that sorts the responses by positive, neutral, and negative opinions. In addition, the response analysis system 104 can determine statistics regarding positive, negative, and neutral opinions. In other examples, the response analysis system 104 ranks the most common opinions for one or more targets. Further, the response analysis system 104 automatically marks the responses with negative and/or neutral opinions for a customer service representative to follow up.

In various embodiments, as mentioned above, the response analysis system 104 provides one or more graphical elements (e.g., buttons, text fields, drop-down menus, etc.) that allow an administrator to provide feedback regarding the response classification labels. In one example, the administrator can approve or disapprove of the response classification labels for a response. In other examples, the administrator reclassifies a word that is incorrectly classified. Upon detecting the change, the response analysis system 104 can update the filtered responses 606 within the graphical user interface to reflect the change. In addition, the response analysis system 104 can use the corrections to further train and update the response classification neural network.

Figure 7:
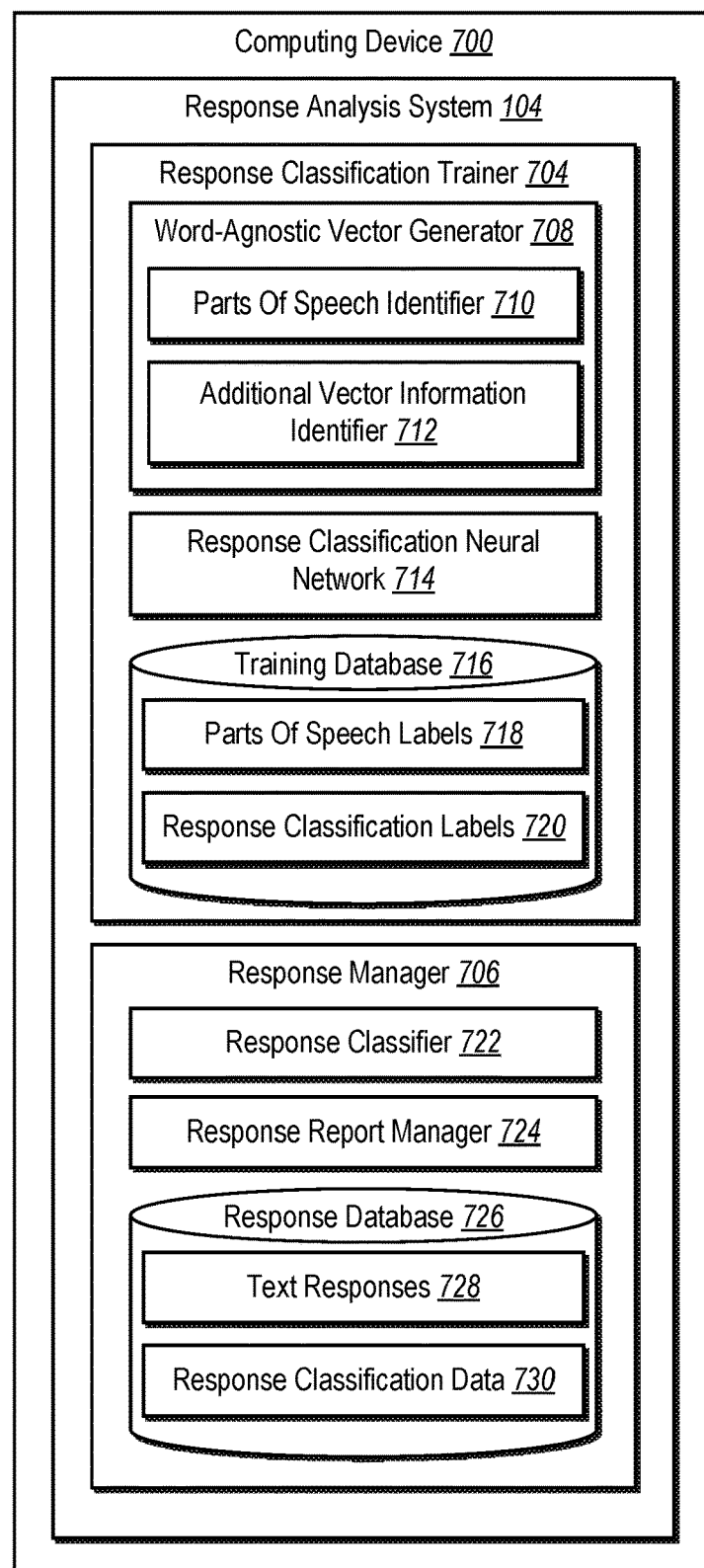
FIG. 7 illustrates a schematic diagram of the response analysis system in accordance with one or more embodiments.

Referring now to FIG. 7, additional detail will be provided regarding capabilities and components of the response analysis system 104 in accordance with one or more embodiments. In particular, FIG. 7 shows a schematic diagram of a response analysis system 104 hosted on a computing device 700. The response analysis system 104 can represent one or more embodiments previously described. For example, while not shown, in some embodiments, the response analysis system 104 is implemented in a survey system (e.g., the survey system 102).

As shown, the response analysis system 104 is located on a computing device 700. In general, the computing device 700 may represent various types of client devices, such as a mobile client device (e.g., a mobile telephone, a smartphone, a PDA, a tablet, a laptop, etc.). In other embodiments, the computing device 700 is a non-mobile device, such as a desktop or server, or another type of client device. Additional details with regard to the computing device 700 are discussed below as well as with respect to FIG. 9.

As illustrated in FIG. 7, the response analysis system 104 includes various components. For example, the response analysis system 104 includes a response classification trainer 704 and a response manager 706. The response classification trainer 704 includes a word-agnostic vector generator 708 having a parts of speech identifier 710 and additional vector information identifier 712, a response classification neural network 714, and a training database 716 storing parts of speech labels 718 and response classification labels 720. The response manager 706 includes a response classifier 722, a response report manager 724, and a response database 726 storing text responses 728 and response classification data 730.

The response classification trainer 704, in general, trains one or more neural network and/or machine-learning algorithms for the purpose of determining or predicting response classification labels for words in opinion responses. For example, in one or more embodiments, the response classification trainer 704 trains a response classification neural network 714, as previously described. In addition, the response classification trainer 704 can generate additional neural networks or machine-learning algorithms, such as a feedback neural network, a parts of speech determination neural network, an attention mechanism neural network, and a word/sentence dependency neural network, each of which is described above.

As shown, the response classification trainer 704 includes the word-agnostic vector generator 708. In general, the word-agnostic vector generator 708 generates one or more word-agnostic vectors for each word input into the response classification neural network, either for training or for prediction. For example, the word-agnostic vector generator 708 generates word-agnostic vectors for words in a training dataset. In another example, the word-agnostic vector generator 708 can generate word-agnostic vectors for words in an input sentence, as described below.

In one or more embodiments, the word-agnostic vector generator 708 generates a word-agnostic vector for words based on the word's parts of speech. For example, the word-agnostic vector generator 708 accesses the parts of speech labels 718 and the response classification labels 720 stored in the training database 716, or from another source, as previously described. In various embodiments, the word-agnostic vector generator 708 converts the parts of speech labels 718 and/or the response classification labels 720 for each word in a training sentence into one or more word-agnostic vectors.

In some embodiments, the word-agnostic vector generator 708 determines the parts of speech label for a word. In these embodiments, the parts of speech identifier 710 within the word-agnostic vector generator 708 identifies a word's parts of speech. In general, the parts of speech identifier 710 parses a sentence to determine the parts of speech for each word in the sentence. In addition, the parts of speech identifier 710 can label, tag, or otherwise annotate each word with its determined part of speech. As described above, the parts of speech identifier 710 can employ a neural network and/or a machine-learning algorithm to automatically determine the parts of speech for words in a sentence.

In additional embodiments, the word-agnostic vector generator 708 generates further word-agnostic vectors (or incorporates added information into existing word-agnostic vectors) for a word based on additional vector information for the word. For example, the additional vector information identifier 712 obtains and/or generates additional vector information, such as dependency label, attention mechanism information, and/or double propagation label information as described above. In various embodiments, the additional vector information identifier 712 generates a word-agnostic vector based on transfer information, as previously described. In some embodiments, the additional vector information identifier 712 generates one or more semantic word vectors for transfer words and/or other words in the training dataset.

Using the word-agnostic vectors and/or additional word vectors (e.g., semantic word vectors), the response classification trainer 704 trains the response classification neural network 714. As described above in detail, the response classification trainer 704 can provide word-agnostic vectors that indicate parts of speech labels 718, response classification labels 720, and optionally additional vector information as input to train the response classification neural network to accurately predict response classification labels for words in an input sentence.

In one or more embodiments, the response classification neural network 714 is a learned parameter space (e.g., latent or non-latent) that is used to predict response classification labels based on detected parts of speech patterns. For example, in some embodiments, the trained response classification neural network 714 indicates the distances between parts of speech associated with two word-agnostic vectors in multidimensional vector space. For instance, the shorter (or farther depending on the implantation) the distances between two parts of speech are within the trained parameter space, the higher the probability of a matching response classification label. Because the trained parameter space is multidimensional, additional considerations, such as parts of speech surrounding the port of speech of an input word also affect the response classification label determination.

The training database 716, as mentioned above, includes the parts of speech labels 718 and the response classification labels 720. In some embodiments, the parts of speech labels 718 and response classification labels 720 correspond to responses (i.e., terms, words, and sentences) in a training dataset. As mentioned above, in many embodiments, the training dataset is a small-data training dataset that includes a relatively small number of sentences for training purposes.

The response manager 706 can store, receive, process, analyze, and/or organize responses (e.g., text responses 728) within the computing device 700. For example, in one or more embodiments, the response manager 706 identifies one or more unclassified opinion text responses (e.g., survey responses). In various embodiments, the response manager 706 stores and retrieves text responses 728 from the response database 726.

The response manager 706 can input the responses into the trained response classification neural network 714 using the response classifier 722. For instance, the response classifier 722 provides word-agnostic vectors that represent each word in an input sentence to the trained response classification neural network 714. In some embodiments, the response classifier 722 obtains one or more word-agnostic vectors for words of an input sentence. For instance, the response classifier 722 communicates with the word-agnostic vector generator 708 described above to generate one or more word-agnostic vectors. Alternatively, the response classifier 722 generates or otherwise obtains word-agnostic vectors for words in an input sentence.

Upon the trained response classification neural network 714 outputting a determination (i.e., response classification labels) for one or more words in the input sentence, the response classifier 722 can provide the response classification labels to the response database 726 as response classification data 730 in connection with the text responses 728. In addition, the response classifier 722 can provide the response classification labels to the response report manager 724.

The response report manager 724 can provide classified responses to a user, such as an administrator. For example, the response report manager 724 provides a graphical user interface that presents filtered responses that include a target portion and an opinion portion, as described above and shown in FIG. 6. In addition, the response report manager 724 can further analyze, organize, process, and/or classify the classified response. In some embodiments, the response report manager 724 accesses full responses and filtered responses from the response database 726, as previously described.

Each of the components 704-730 of the response analysis system 104 can include software, hardware, or both. For example, the components 704-730 can include one or more instructions stored on a computer-readable storage medium and executable by processors of one or more computing devices, such as a client device or server device. When executed by the one or more processors, the computer-executable instructions of the response analysis system 104 can cause the computing device(s) to perform the feature learning methods described herein. Alternatively, the components 704-730 can include hardware, such as a special-purpose processing device to perform a certain function or group of functions. Alternatively, the components 704-730 of the response analysis system 104 can include a combination of computer-executable instructions and hardware.

Furthermore, the components 704-730 of the response analysis system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 704-730 may be implemented as a stand-alone application, such as a desktop or mobile application. Furthermore, the components 704-730 may be implemented as one or more web-based applications hosted on a remote server. The components 704-730 may also be implemented in a suite of mobile device applications or "apps."

FIGS. 1-7, the corresponding text, and the examples provide a number of different methods, systems, devices, and non-transitory computer-readable media of the response analysis system 104. In addition to the foregoing, one or more embodiments can also be described in terms of flowcharts comprising acts for accomplishing a particular result. For example, FIG. 8 illustrates a flowchart of a series of acts 800 of training and determining response classification labels in accordance with one or more embodiments.

Figure 8:
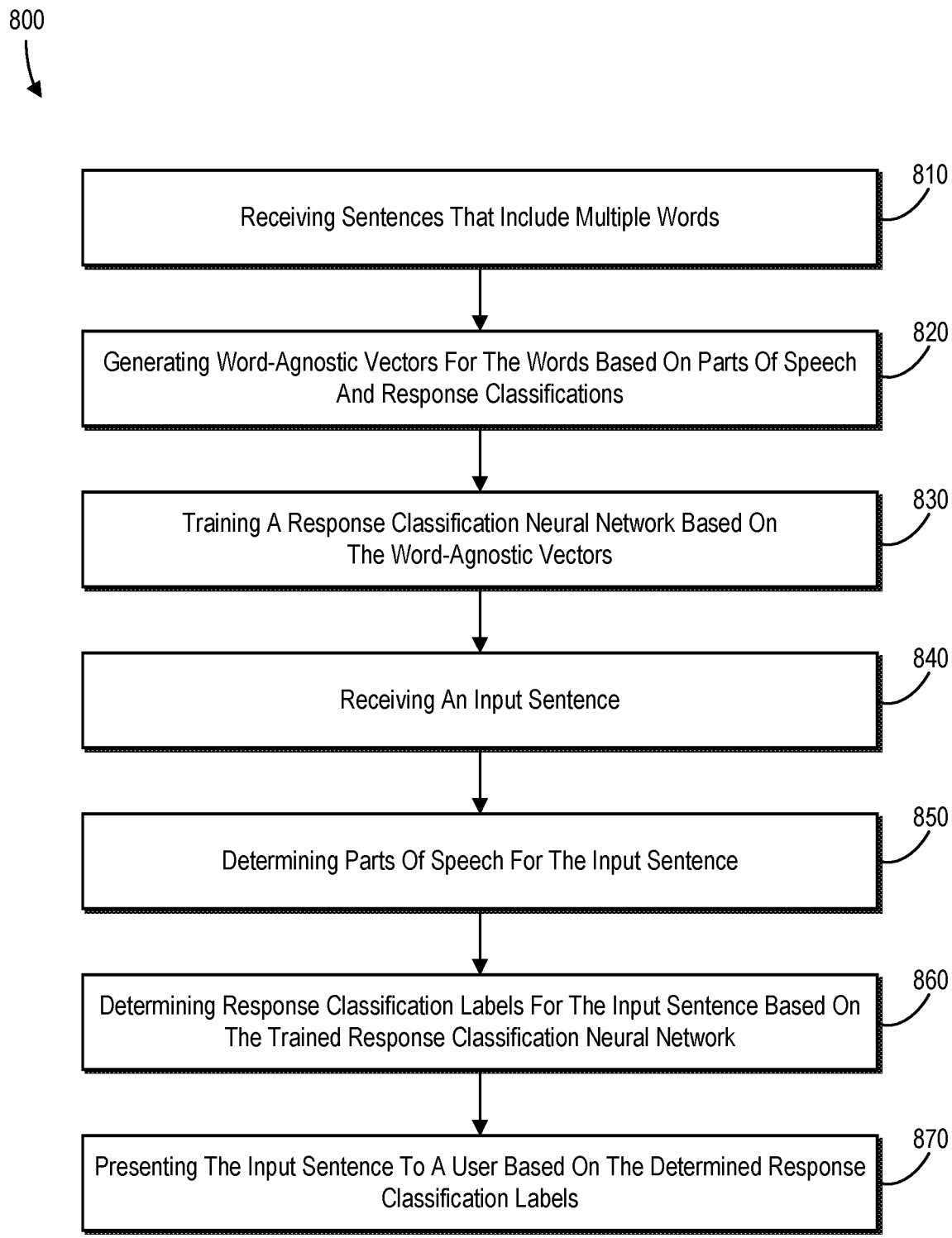
FIG. 8 illustrates a flowchart of a series of acts for training and determining response classification labels in accordance with one or more embodiments.

While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8. In addition, in one or more embodiments, the series of acts 800 is implemented on one or more computing devices, such as a server device 101 and/or computing device 700.

The series of acts 800 includes an act 810 of receiving sentences that include multiple words. In particular, the act 810 can involve receiving a plurality of sentences that comprise a plurality of words. In one or more embodiments, the act 810 includes obtaining a training dataset including a plurality of sentences that include a plurality of words, where each of the plurality of words is assigned a response classification label. In some embodiments, the training dataset is a small-data training dataset that includes 2,500 or fewer sentences.

As shown, the series of acts 800 also includes an act 820 of generating word-agnostic vectors for the words based on parts of speech and response classifications. In particular, the act 820 can involve generating word-agnostic vectors for the plurality of words from each of the plurality of sentences based on a part of speech label assigned to each word of the plurality of words and a response classification label assigned to each word of the plurality of words. In one or more embodiments, the act 820 also includes generating the word-agnostic vectors based on a dependency label assigned to each word of the plurality of words and/or transfer information that classifies one or more particular words not included in the training dataset with an assigned part of speech label. In some embodiments, the word-agnostic vectors omit semantic word information corresponding to the plurality of words from each of the plurality of sentences.

As shown in FIG. 8, the series of acts 800 further includes an act 830 of training a response classification neural network based on the word-agnostic vectors. In particular, the act 830 can involve training a response classification neural network based on the word-agnostic vectors for each word of the plurality of words from the plurality of sentences, where the response classification neural network indicates distances between parts of speech associated with two word-agnostic vectors. In some embodiments, the act 830 also includes training the response classification neural network based on sequence learning that learns a word-agnostic vector for a word in a sentence of the plurality of sentences based on one or more previous words in the sentence. In addition, in various embodiments, the trained response classification neural network outputs a response classification label for an input word within an input sentence.

In some embodiments, the act 830 further includes training the response classification neural network based on an attention mechanism that computes a weighted representation of a sentence of the plurality of sentences. In various embodiments, the trained response classification neural network is a bi-directional long short-term memory recurrent neural network. Additionally, in one or more embodiments, the act 830 includes pairing an opinion label with a target classification label in one or more sentences of the plurality of sentences as part of training the response classification neural network.

As shown, the series of acts 800 also includes an act 840 of receiving an input sentence. In particular, the act 840 can involve receiving an input sentence including one or more words. In one or more embodiments, the input sentence is an unclassified free-form text survey response (e.g., opinion text response).

In addition, the series of acts 800 includes an act 850 of determining parts of speech for the input sentence. In particular, the act 850 can involve determining parts of speech for each word of the one or more words in the input sentence. In one or more embodiments, the act 850 includes automatically parsing the plurality of sentences to identify the part of speech label associated with each word of the plurality of words, and assigning, to each word of the plurality of words, the identified part of speech label corresponding to each word. In some embodiments, the number of parts of speech is 50 parts of speech.

As shown, the series of acts 800 further includes an act 860 of determining response classification labels for the input sentence based on the trained response classification neural network. In particular, the act 860 can involve determining, based on the one or more words and the trained response classification neural network, a response classification label for each word of the plurality of words from the input sentence. In one or more embodiments, the response classification label includes one of a target classification label, an opinion classification label, or a neither classification label.

As shown, the series of acts 800 also includes an act 870 of presenting the input sentence to a user based on the determined response classification labels. In particular, the act 870 can involve presenting, to a user, a target portion and an opinion portion of the input sentence based on the response classification label determined for each word of the plurality of words from the input sentence. In one or more embodiments, the target portion includes words of the plurality of words having a target classification label. In some embodiments, the opinion portion includes words of the plurality of words having an opinion classification label.

The series of acts 800 can also include a number of additional acts. In one or more embodiments, the series of acts 800 includes the act of training the response classification neural network as a first bi-directional long short-term memory recurrent neural network. In addition, the series of acts 800 include the act of determining the response classification label for each word of the plurality of words from the input sentence based on a second bi-directional long short-term memory recurrent neural network that provides a response classification determination (e.g., response classification labels) for a previous word in the input sentence as input to the first bi-directional long short-term memory recurrent neural network when determining the response classification for a subsequent word in the input sentence.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
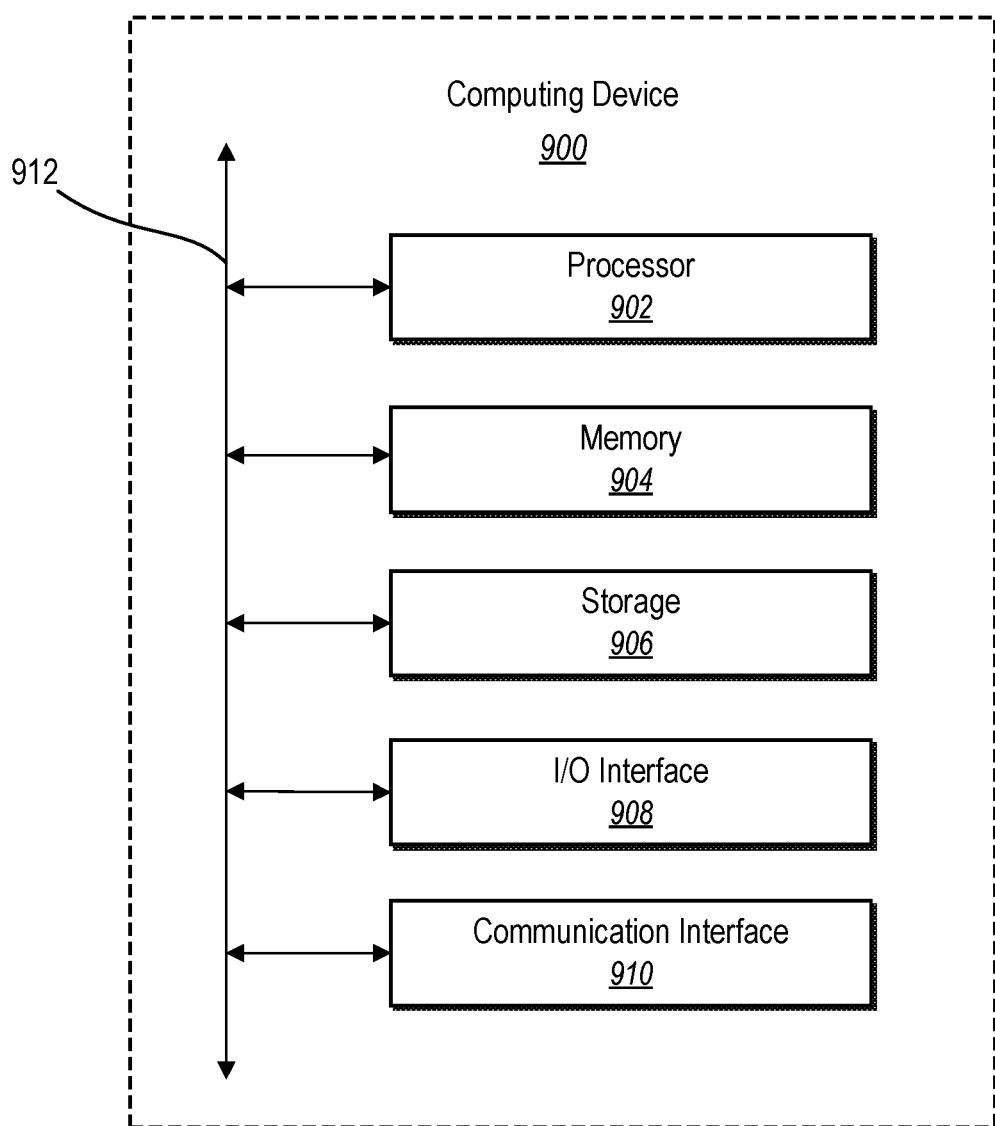
FIG. 9 illustrates a block diagram of an exemplary computing device for implementing one or more embodiments of the present disclosure.

FIG. 9 illustrates a block diagram of an exemplary computing device 900 that may be configured to perform one or more of the processes described above. One will appreciate that one or more computing devices, such as the computing device 900 may represent the computing devices described above (e.g., server device 101, client devices 106, 108, 600, and computing device 700). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or simply "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

Figure 10:
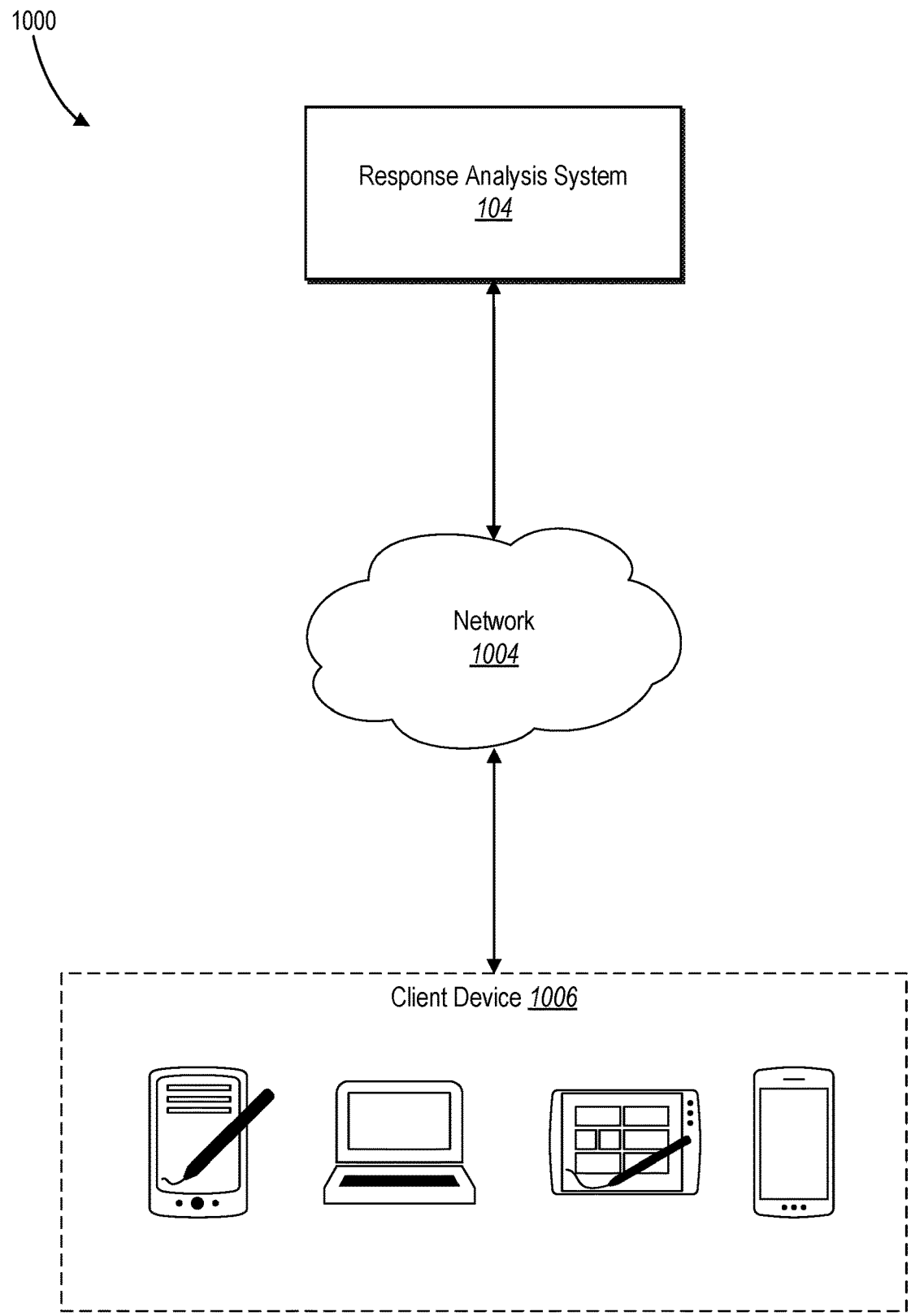
FIG. 10 illustrates an example network environment of response analysis system in accordance with one or more embodiments described herein.

FIG. 10 illustrates an example network environment 1000 of a response analysis system 104, such as embodiments of the response analysis system described herein. The network environment 1000 includes the response analysis system 104 and a client device 1006 connected to each other by a network 1004. Although FIG. 10 illustrates a particular arrangement of the response analysis system 104, the client device 1006, and the network 1004, one will appreciate that other arrangements of the network environment 1000 are possible. For example, a client device of the client device 1006 is directly connected to the response analysis system 104. Moreover, this disclosure contemplates any suitable number of client systems, response analysis system s, and networks are possible. For instance, the network environment 1000 includes multiple client systems.

This disclosure contemplates any suitable network. As an example, one or more portions of the network 1004 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, a safelight network, or a combination of two or more of these. The term "network" may include one or more networks and may employ a variety of physical and virtual links to connect multiple networks together.

In particular embodiments, the client device 1006 is an electronic device including hardware, software, or embedded logic components or a combination of two or more such components and capable of carrying out the appropriate functionalities implemented or supported by the client system. As an example, the client device 1006 includes any of the computing devices discussed above. The client device 1006 may enable a user at the client device 1006 to access the network 1004. Further, the client device 1006 may enable a user to communicate with other users at other client systems.

In some embodiments, the client device 1006 may include a web browser, such as and may have one or more add-ons, plug-ins, or other extensions. The client device 1006 may render a web page based on the HTML files from the server for presentation to the user. For example, the client device 1006 renders the graphical user interface described above.

In one or more embodiments, the response analysis system 104 includes a variety of servers, sub-systems, programs, modules, logs, and data stores. In some embodiments, response analysis system 104 includes one or more of the following: a web server, action logger, API-request server, relevance-and-ranking engine, content-object classifier, notification controller, action log, third-party-content-object-exposure log, inference module, authorization/privacy server, search module, user-targeting module, user-interface module, user-profile store, connection store, third-party content store, or location store. The response analysis system 104 may also include suitable components such as network interfaces, security mechanisms, load balancers, failover servers, management-and-network-operations consoles, other suitable components, or any suitable combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   at least one non-transitory computer-readable storage medium storing instructions that, when executed by the at least one processor, cause the system to:
   determine a part of speech for each word within an input sentence;

determine a response classification label for each word within the input sentence based on the determined parts of speech for each word;

identify a target portion of the input sentence and an opinion portion of the input sentence based on the response classification label for each word within the input sentence; and provide, to a client device associated with a user, the target portion and the opinion portion of the input sentence.

2. The system of claim 1, wherein the input sentence is part of a free-form text survey response.

3. The system of claim 1, wherein the response classification label comprises one of a target classification label, an opinion classification label, or a neither classification label.

4. The system of claim 3, wherein:
the target portion comprises at least one word within the input sentence corresponding to the target classification label; and
the opinion portion comprises at least one word within the input sentence corresponding to the opinion classification label.

5. The system of claim 1, further comprising instructions that, when executed by the at least one processor, cause the system to provide the input sentence to a response classification neural network, wherein the response classification neural network determines the response classification label for each word within the input sentence based in part on the part of speech for each word.

6. The system of claim 1, further comprising instructions that, when executed by the at least one processor, cause the system to parse the input sentence to identify the part of speech for each word within the input sentence.

7. The system of claim 1, wherein the instructions, when executed by the at least one processor, cause the system to determine the response classification label for each word within the input sentence based on the determined parts of speech for each word and further based on one or more adjacent words.

8. A non-transitory computer-readable medium storing instructions that, when executed by at least one processor, cause a computing device to:
determine a part of speech for each word within an input sentence;
determine a response classification label for each word within the input sentence based on the determined parts of speech for each word;
identify a target portion of the input sentence and an opinion portion of the input sentence based on the response classification label for each word within the input sentence; and
provide, to a client device associated with a user, the target portion and the opinion portion of the input sentence.

9. The non-transitory computer-readable medium of claim 8, wherein the input sentence is part of a free-form text survey response.

10. The non-transitory computer-readable medium of claim 8, wherein the response classification label comprises one of a target classification label, an opinion classification label, or a neither classification label.

11. The non-transitory computer-readable medium of claim 10, wherein:
the target portion comprises at least one word within the input sentence corresponding to the target classification label; and
the opinion portion comprises at least one word within the input sentence corresponding to the opinion classification label.

12. The non-transitory computer-readable medium of claim 8, further comprising instructions that, when executed by the at least one processor, cause the computing device to provide the input sentence to a response classification neural network, wherein the response classification neural network determines the response classification label for each word within the input sentence based in part on the part of speech for each word.

13. The non-transitory computer-readable medium of claim 8, further comprising instructions that, when executed by the at least one processor, cause the computing device to parse the input sentence to identify the part of speech for each word within the input sentence.

14. A method comprising:
determining, by at least one processor, a part of speech for each word within an input sentence;
determining, by at least one processor, a response classification label for each word within the input sentence based on the determined parts of speech for each word;
identifying, by at least one processor, a target portion of the input sentence and an opinion portion of the input sentence based on the response classification label for each word within the input sentence; and
providing, to a client device associated with a user, the target portion and the opinion portion of the input sentence.

15. The method of claim 14, wherein the input sentence is part of a free-form text survey response.

16. The method of claim 14, wherein the response classification label comprises one of a target classification label, an opinion classification label, or a neither classification label.

17. The method of claim 16, wherein:
the target portion comprises at least one word within the input sentence corresponding to the target classification label; and
the opinion portion comprises at least one word within the input sentence corresponding to the opinion classification label.

18. The method of claim 14, further comprising providing the input sentence to a response classification neural network, wherein the response classification neural network determines the response classification label for each word within the input sentence based in part on the part of speech for each word.

19. The method of claim 14, further comprising parsing the input sentence to identify the part of speech for each word within the input sentence.

20. The method of claim 14, further comprising associating a part of speech label with each word within the input sentence based on the part of speech identified for each word within the input sentence.

* * * * *